US009567522B2

(12) United States Patent
Schott et al.

(10) Patent No.: US 9,567,522 B2
(45) Date of Patent: *Feb. 14, 2017

(54) LIQUID CRYSTAL SYSTEM AND LIQUID CRYSTAL DISPLAY

(71) Applicant: MERCK PATENT GMBH, Darmstadt (DE)

(72) Inventors: Cecile Schott, Taipei (TW); John Patrick, Warham (GB); Kevin Adlem, Bournemouth (GB); Louise Farrand, Dorset (GB); Georg Bernatz, Darmstadt (DE); Achim Goetz, Alsbach-Haehnlein (DE); Peter Best, Darmstadt (DE); Herbert Plach, Darmstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 233 days.

This patent is subject to a terminal disclaimer.

(21) Appl. No.: 13/801,403

(22) Filed: Mar. 13, 2013

(65) Prior Publication Data
US 2013/0193376 A1     Aug. 1, 2013

Related U.S. Application Data

(62) Division of application No. 13/243,472, filed on Sep. 23, 2011, now Pat. No. 8,409,469, which is a division of application No. 12/823,186, filed on Jun. 25, 2010, now Pat. No. 8,333,906, which is a division of application No. 11/721,849, filed on Jun. 15, 2007, now Pat. No. 7,794,621.

(30) Foreign Application Priority Data

Dec. 17, 2004    (EP)  .................................... 04029972

(51) Int. Cl.
     *C09K 19/02*      (2006.01)
     *C09K 19/38*      (2006.01)
     *C09K 19/58*      (2006.01)

(52) U.S. Cl.
     CPC .......... *C09K 19/0275* (2013.01); *C09K 19/38* (2013.01); *C09K 19/586* (2013.01); *C09K 19/588* (2013.01); *Y10T 428/10* (2015.01); *Y10T 428/1036* (2015.01)

(58) Field of Classification Search
     CPC ... C09K 19/0275; C09K 19/38; C09K 19/586; C09K 19/588; Y10T 428/10; Y10T 428/1036
     USPC ............. 349/86, 182, 183; 252/299.5, 299.6, 252/299.01; 428/1.1, 1.3
     See application file for complete search history.

(56) References Cited

U.S. PATENT DOCUMENTS

| 5,723,066 A | 3/1998 | Coates et al. |
|---|---|---|
| 5,746,938 A | 5/1998 | Coates et al. |
| 5,871,665 A | 2/1999 | Coates et al. |
| 6,042,745 A | 3/2000 | Coates et al. |
| 6,187,222 B1 | 2/2001 | Coates et al. |
| 6,217,792 B1 | 4/2001 | Parri et al. |
| 6,511,719 B2 | 1/2003 | Farrand |
| 6,565,769 B2 | 5/2003 | Coates et al. |
| 6,596,193 B2 | 7/2003 | Coates et al. |
| 6,669,865 B1 | 12/2003 | Coates et al. |
| 6,682,661 B2 | 1/2004 | Coates et al. |
| 6,995,825 B2 | 2/2006 | Graham et al. |
| 7,041,345 B2 | 5/2006 | Kirsch et al. |
| 7,060,331 B2 | 6/2006 | Kirsch et al. |
| 7,223,450 B2 | 5/2007 | Taugerbeck et al. |
| 7,318,950 B2 | 1/2008 | Kirsch et al. |
| 7,344,762 B2 | 3/2008 | Hammond-Smith et al. |
| 7,425,356 B2 | 9/2008 | Taugerbeck et al. |
| 7,582,227 B2 | 9/2009 | Verall et al. |
| 7,794,621 B2 * | 9/2010 | Schott et al. ............ 252/299.01 |
| 8,333,906 B2 | 12/2012 | Schott et al. |
| 8,333,960 B2 | 12/2012 | Attawia et al. |
| 8,409,469 B2 * | 4/2013 | Schott et al. ............ 252/299.61 |
| 2006/0050354 A1 | 3/2006 | Heckmeier et al. |
| 2006/0263542 A1 | 11/2006 | Kirsch et al. |
| 2009/0267025 A1 | 10/2009 | Schott et al. |
| 2010/0258763 A1 | 10/2010 | Schott et al. |
| 2013/0193376 A1 | 8/2013 | Schott et al. |

FOREIGN PATENT DOCUMENTS

| EP | 174931 A1 | 1/2007 |
|---|---|---|
| GB | 2328207 A | 2/1999 |

(Continued)

OTHER PUBLICATIONS

Kikuchi, H., et al., "Polymer-stabilized liquid crystal blue phases," Nature Materials, vol. 1, Sep. 2002, pp. 64-68.
Kikuchi, H., et al., "Liquid crystal material for optical modulation element," YTH Translation—JP(A) 2003-327966, Applied: May 8, 2002, Application No. P2002-132303, Laid-Open Date: Nov. 19, 2003, 12 pages.
Kikuchi, H., et al., "Stabilization of Cholesteric Blue Phase with Polymer," Polymeric Materials: Science & Engineering, 2003, 89, 90, 2 pages.

(Continued)

*Primary Examiner* — Geraldina Visconti
(74) *Attorney, Agent, or Firm* — Millen, White, Zelano & Branigan, P.C.

(57) ABSTRACT

The instant invention relates to mesogenic systems comprising a) a polymeric component, component A, obtained or obtainable from polymerisation of a precursor comprising one or more mesogenic mono-reactive compounds, one or more di-reactive compounds, which optionally are also mesogenic compounds and optionally a photo-initiator and a low molecular weight component, component B, comprising one or more mono-reactive, mesogenic compounds, one or more mesogenic compounds and one or more chiral dopants, exhibiting a Blue Phase, as well as to the use of these systems in deices and to these devices.

9 Claims, No Drawings

(56) References Cited

FOREIGN PATENT DOCUMENTS

| | | |
|---|---|---|
| GB | 2 355 720 | 5/2001 |
| JP | 2003 327966 A | 12/2003 |
| TW | 200423709 | 11/2004 |
| WO | 9322397 A1 | 11/1993 |
| WO | 0206195 A1 | 1/2002 |
| WO | 0206196 A1 | 1/2002 |
| WO | 0206265 A1 | 1/2002 |
| WO | 0234739 A1 | 5/2002 |
| WO | 0294805 A1 | 11/2002 |
| WO | 2004090024 A1 | 10/2004 |
| WO | WO-2005/080529 | 9/2005 |
| WO | WO-2005/090520 A | 9/2005 |
| WO | 98/00428 A1 | 8/2009 |

OTHER PUBLICATIONS

C. Tschierske et al., "Definitionen von Grundbegriffen mit Bezug zu niedermolekularen und polymeren Flussigkristallen"; Angew,. Chem. 2004, 116, 6340-6368.

* cited by examiner

LIQUID CRYSTAL SYSTEM AND LIQUID CRYSTAL DISPLAY

FIELD OF THE INVENTION

The present invention relates to mesogenic media and to electro-optical displays comprising these mesogenic media as light modulation media, in particular to mesogenic media comprising polymeric material and to displays, which are operated at a temperature at which the mesogenic modulation media are in an optically isotropic phase, preferably in a blue phase.

PROBLEM TO BE SOLVED AND STATE OF THE ART

Electro-optical displays and mesogenic light modulation media, which are in the isotropic phase when being operated in the display are described in DE 102 17 273 A. Electro-optical displays, and mesogenic light modulation media, which are in the so-called blue phase, when being operated in the display are described in DE 103 13 979.6.

The mesogenic media and displays described in these references provide several significant advantages compared to well-known and widely used displays using liquid crystals in the nematic phase, like for example liquid crystal displays (LCDs) operating in the twisted nematic (TN)-, the super twisted nematic (STN)-, the electrically controlled birefringence (ECB)-mode with its various modifications like e.g. the vertically aligned nematic (VAN) mode and the in-plane switching (IPS)-mode. Amongst these advantages most pronounced are their much faster switching times, and significantly wider optical viewing angle.

Whereas, compared to displays using mesogenic media in another liquid crystalline phase, as e.g. in the smectic phase in surface stabilized ferroelectric liquid crystal displays (SSF LCDs), the displays of DE 102 17 273.0 and DE 103 13 979 are much easier to produce. For example, they do not require a very thin cell gap and the electro-optical effect is not very sensitive to small variations of the cell gap.

However, the liquid crystal media described in these mentioned patent applications still require operating voltages, which are not low enough for some applications. Further the operating voltages of these media vary with temperature, and it is generally observed, that at a certain temperature the voltage dramatically increases with increasing temperature. This limits the applicability of liquid crystal media in the blue phase for display applications. A further disadvantage of the liquid crystal media described in these patent applications is their moderate reliability which is insufficient for very demanding applications. This moderate reliability may be for example expressed in terms of the voltage holding ratio parameter (VHR), which in liquid crystal media as described above may be below 90%.

Some compounds and compositions have been reported which possess a blue phase between the cholesteric phase and the isotropic phase and can usually be observed by optical microscopy. These compounds or compositions for which the blue phases are observed are typically single mesogenic compounds or mixtures showing a high chirality. However, generally the blue phases observed only extend over a very small temperature range, which is typically less than 1 degree centigrade (Kelvin) wide. In order to operate the novel fast switching display mode of DE 103 13 979.6 the light modulation medium to be used has to be in the blue phase. Thus a light modulation medium possessing a blue phase, which is as wide as possible, is required.

Therefore there is a strong need for a modulation medium with a blue phase with a wide phase range, which may be achieved either by an appropriate mixture of mesogenic compounds themselves or, preferably by mixing a host mixture with appropriate mesogenic properties with a single dopant or a mixture of dopants that stabilises the blue phase over a wide temperature range.

Kikuchi, H. et al., *Polymeric Materials Science and Engineering* (2002), 1(1), 64-68 and Kikuchi, H. et al., *Polymeric Materials Science and Engineering*, (2003), 89, 90-91 describe in-situ polymerisation to stabilise the Blue Phase over a temperature range, which is 60° wide and including ambient temperature (206 to 326K), respectively over a temperature range, which is 120° wide and including room temperature (200K-326K) using a non-mesogenic mono-reactive monomer, such as 2-ethyl hexyl acrylate together with a di-reactive mesogen (e.g. RM257, available from Merck KGaA) in a nematic host mixture.

H. Kikuchi, JP(A)2003-327966, describes a composite liquid crystal for use as optical modulation element with specific composition comprising a low molecular weight liquid crystal, which possesses a Blue Phase and a polymer network within this medium obtained by polymerisation of non-liquid crystalline monomers together with a cross-linking agent RM257. In particular, the preferred embodiment is for branched monoacrylate monomers with alkyl side group as a side-chain.

However, these systems have significant drawbacks, as the precursors of the polymers are not particularly well soluble in the liquid crystal hosts, respectively in the mesogenic hosts, required for application in devices and/or as, in most cases, it is necessary to adjust the temperature of the system during the process of polymerising the precursor of the polymer, as the transition temperatures of the mesophases and thus the temperature range over which the blue phase exists, change during the very process.

Summarizing, there is a need for liquid crystal media, which can be operated in liquid crystal displays, which are operated at temperatures where the media is in the blue phase, which provide the following technical improvements:

a broad phase range of the blue phase, a broad range of temperatures over which the electro-optical effect can be used without the response time becoming too large for practical applications, ease of fabrication by good solubility of the precursors of the polymer in the host and/or relative small change of the transition temperatures during the process of the polymerisation of the precursor of the polymer.

reduced operating voltage, a reduced temperature dependency of the operating voltage and an improved reliability, e.g. VHR.

Present Invention

Surprisingly, it has now been found that mesogenic modulation media comprising a polymer obtainable from a precursor comprising a mono-reactive mesogenic monomer, are suitable to considerably enhance the range of temperatures over which the blue phase is stable or even induce a blue phase in respective mesogenic hosts, which do not show such a phase on their own. Preferably the mesogenic hosts are liquid crystalline hosts.

Thus the present invention preferably relates to mesogenic systems comprising:
a) a polymeric component, component A, obtained or obtainable from polymerisation of a precursor comprising
   i. one or more mesogenic mono-reactive compounds,
   ii. one or more di-reactive compounds, which optionally are also mesogenic compounds and
   iii. optionally a photo-initiator and
b) a low molecular weight component, component B, comprising
   iv. one or more mesogenic compounds and
   v. one or more chiral dopants,
exhibiting a Blue Phase.

Preferably the system according to the present invention comprise a component A comprising one or more mesogenic di-reactive compounds and/or comprise a component A comprising one or more non-mesogenic (isotropic) mono-reactive compounds and/or one or more compounds, which on their own lead or would lead to an increase of the characteristic temperatures (e.g. the transition temperature from the Blue Phase into the isotropic phase) during and/or upon it's polymerisation and simultaneously one or more compounds which on their own lead or would lead to a decrease of the characteristic temperatures (e.g. the transition temperature from the Blue Phase into the isotropic phase) during and/or upon its polymerisation and/or Exhibit characteristic temperatures, which do not change significantly during and/or upon polymerisation of the precursor of the polymer and/or have a Blue Phase extending at least over a temperature range from −10° C. or below to +50° C. or above.

The present invention further relates to light modulation elements comprising one or more systems according to the present invention electro-optical displays comprising these light modulation elements.

The present invention also relates to the use of systems according to the present invention as a light modulation media, as well as to the use of systems according to the present invention in light modulation elements.

In a further aspect the present invention relates to a process of producing a system according to the present invention, characterised in that the characteristic temperature(s) of the system do not change significantly during the polymerisation of the precursor of the polymer. By this feature it is not necessary to adjust the temperature at which the polymerisation is performed during the process in order to keep it within the range of the blue phase, which is often required.

The mesogenic mono-reactive compounds used according to the present invention preferably comprise one or more ring elements, linked together by a direct bond or via a linking group and, where two of these ring elements optionally may be linked to each other, either directly or via a linking group, which may be identical to or different from the linking group mentioned. The ring elements are preferably selected from the group of four-, five-, six- or seven-, preferably of five- or six-, membered rings.

Preferably used are mono-reactive mesogens of formula IA

IA wherein
$R^{11}$ is H, F, Cl, Br, I, CN, $NO_2$, NCS, $SF_5$, $SO_2CF_3$ or alkyl which is straight chain or branched, preferably has 1 to 20 C-atoms, is unsubstituted, mono- or poly-substituted by F, Cl, Br, I or CN, and in which one or more non-adjacent $CH_2$ groups are optionally replaced, in each case independently from one another, by —O—, —S—, —NH—, —$NR^{01}$—, —$SiR^{01}R^{02}$—, —CO—, —COO—, —OCO—, —OCO—O—, —S—CO—, —CO—S—, —$CY^1$=$CY^2$— or —C≡C— in such a manner that O and/or S atoms are not linked directly to one another, preferably H, Halogen, n-alkyl, n-alkoxy with 1 to 7 C-atoms preferably 2 to 5 C-atoms, alkenyl, alkenyloxy or alkoxyalkyl with 2 to 7 C-atoms, preferably with 2 to 5 C-atoms or CN, NCS, halogen, preferably F, Cl, halogenated alkyl, alkenyl or alkoxy, preferably mono-, di- or oligo-fluorinated alkyl, alkenyl or alkoxy, especially preferred $CF_3$, $OCF_2H$ or $OCF_3$, $R^{01}$ and $R^{02}$ are, independently of each other, H or alkyl with 1 to 12 C-atoms,

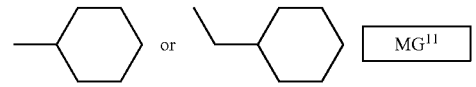

is a mesogenic moiety, preferably comprising one or more rings and most preferably is a divalent radical of the formula

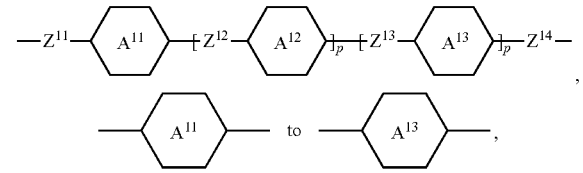

are, independently of each other, an aromatic and/or alicyclic ring, or a group comprising two or more fused aromatic or alicyclic rings, wherein these rings optionally contain one or more hetero atoms selected from N, O and/or S, and are optionally mono- or polysubstituted by R, $Z^{11}$ to $Z^{14}$ are, independently of each other, —O—, —S—, —CO—, —CO—O—, —O—CO—, —S—CO—, —CO—S—, —O—CO—O—, —CO—$NR^{01}$—, —$NR^{01}$—CO—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$CF_2CH_2$—, —$CH_2CF_2$—, —$CF_2CF_2$—, —CH=N—, —N=CH—, —N=N—, —CH=$CR^{01}$—, —$CY^{01}$=$cy^{02}$—, —C≡C—, —$(CH_2)_4$—, —CH=CH—CO—O—, —O—CO—CH=CH— or a single bond, $Y^{01}$ and $Y^{02}$ are, independently of each other, F, CL or CN, and alternatively one of them may be H, R is H or alkyl, preferably H or alkyl with 1 to 10 C-atoms, $PG^{11}$ is a polymerisable or reactive group, $SG^{11}$ is a spacer group or a single bond, and $X^{11}$ has one of the meanings given for $Z^{11}$ and preferably is —O—, —CO—O—, —O—CO—, —$CF_2O$—, —$OCF_2$—, —$CH_2O$—, —$OCH_2$— or a single bond.

In a preferred embodiment of the present invention the precursor of the polymer comprises, besides the compound(s) of formula IA one or more di-reactive mesogenic monomers, preferably of formula IB

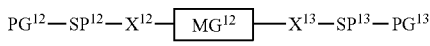

wherein

has the meaning given for

under formula I above,
PG$^{12}$ and PG$^{13}$, independently of each other, have one of the meanings given for PG$^{11}$ under formula I above,
SG$^{12}$ and SG$^{13}$, independently of each other, have one of the meanings given for SG$^{11}$ under formula I above, and
X$^{12}$ and X$^{13}$, independently of each other, have one of the meanings given for X$^{11}$ under formula I above.

In a preferred embodiment the compounds according to the present invention are chiral compounds, i.e. a group with a chiral centre, preferably a chirally substituted atom and most preferably a chirally substituted C-atom.

Particularly preferred are polymer precursors comprising one or more compounds of formula I and/or of formula II, wherein
    Z$^{11}$ and/or Z$^{14}$ is —O—, —CO—O—, —OCO—, —O—CO—O—, —CH$_2$—O—, —O—CH$_2$—, —CF$_2$—O—, —O—CF$_2$—, —C≡C—, —CH=CH— or a single bond, most preferably —CO—O— or —O—CO— or —O— and/or
    Z$^{11}$ is different from a single bond and/or
    ring A$^{11}$ is phenylene that is optionally substituted by one or more groups R and/or
    R$^{11}$ is alkyl or alkoxy with 1 to 12, preferably 1 to 8 C-atoms, or alkenyl, alkenyloxy or alkynyl with 2 to 12, preferably 2 to 7 C-atoms and/or
    SG$^{11}$ is alkylene with 1 to 12 C atoms which is optionally mono- or polysubstituted by F and wherein one or more non-adjacent CH$_2$ may be replaced, in each case independently from one another, by —O—, —CH=CH— or —C≡C—, and that is linked to a ring, preferably to ring A$^1$ via a group selected from —O—, —CO—O—, —O—CO—, —O—CO—O— and a single bond and/or
    SG$^{11}$ is a single bond.

Preferences for MG$^{12}$ to X$^{13}$ are the same as for MG$^{12}$X$^{11}$.

In a preferred embodiment rings A$^{11}$ to A$^{13}$ are, independently of each other, an aromatic or alicyclic ring, preferably a 5-, 6- or 7-membered ring, or a group comprising two or more, preferably two or three, fused aromatic or alicyclic rings, wherein these rings optionally contain one or more hetero atoms selected from N, O and/or S, and are optionally mono- or polysubstituted with L, wherein L is F, Cl, Br, CN, OH, NO$_2$, and/or an alkyl, alkoxy, alkylcarbonyl or alkoxycarbonyl group with 1 to 12 C atoms, wherein one or more H atoms are optionally replaced by F or Cl.

L is preferably F, Cl, CN, OH, NO$_2$, CH$_3$, C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$ or OC$_2$F$_5$, in particular F, Cl, CN, CH$_3$, C$_2$H$_5$, OCH$_3$, COCH$_3$ or OCF$_3$, most preferably F, Cl, CH$_3$, OCH$_3$ or COCH$_3$.

Preferred rings A$^{11}$ to A$^{13}$ are, for example, furan, pyrrol, thiophene, oxazole, thiazole, thiadiazole, imidazole, phenylene, cyclohexylene, cyclohexenylene, pyridine, pyrimidine, pyrazine, azulene, indane, naphthalene, tetrahydronaphthalene, decahydronaphthalene, tetrahydropyrane, anthracene, phenanthrene and fluorene.

Particularly preferably one or more of these rings A$^{11}$ to A$^{13}$ is selected from furane-2,5-diyl, thiophene-2,5-diyl, thienothiophene-2,5-diyl, dithienothiophene-2,6-diyl, pyrrol-2,5-diyl, 1,4-phenylene, azulene-2,6-diyl, pyridine-2,5-diyl, pyrimidine-2,5-diyl, naphthalene-2,6-diyl, 1,2,3,4-tetrahydro-naphthalene-2,6-diyl, indane-2,5-diyl, or 1,4-cyclohexylene wherein one or two non-adjacent CH$_2$ groups are optionally replaced by O and/or S, wherein these groups are unsubstituted, mono- or polysubstituted by L as defined above.

Preferably

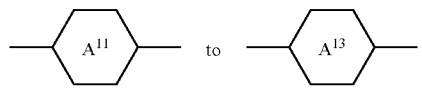

independently of each other, are,

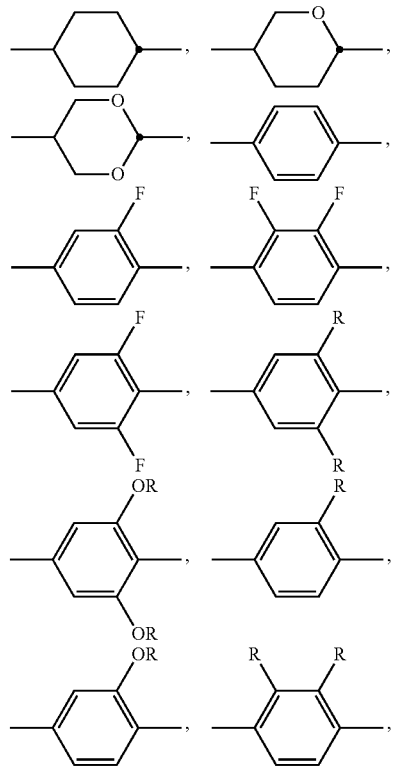

or their mirror images
wherein
R is alkyl with 1 to 12 C-atoms, preferably with 1 to 7 C-atoms, or alkenyl or alkynyl with 2 to 12 C-atoms, preferably with 2 to 7 C-atoms, in both of which one or more non-adjacent —CH$_2$— groups, not adjacent to the phenyl ring, may be replaced by —O— and/or —CH=CH— and/or one or more H-atoms may be replaced by halogen, preferably by F, or their mirror images.

wherein

R and R', independently of one another, have one of the meanings given for R above and preferably is alkyl, preferably methyl, ethyl or propyl and/or preferably

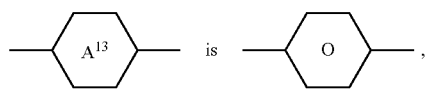

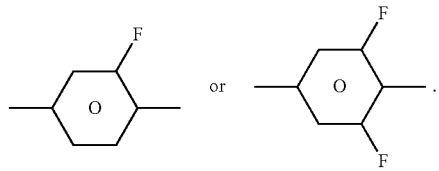

In a preferred embodiment of the present invention the group

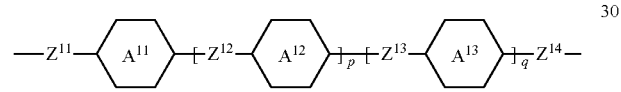

contains only monocyclic rings A$^{11}$ to A$^{13}$. Very preferably this is a group with one or two 5- and/or 6-membered rings.

Preferred sub formulae for this group are listed below. For reasons of simplicity, Phe in these groups is 1,4-phenylene, PheL is a 1,4-phenylene group which is substituted by 1 to 4 groups L as defined above, Cyc is 1,4-cyclohexylene, Pyd is pyridine-2,5-diyl and Pyr is pyrimidine-2,5-diyl. The following list of preferred groups is comprising the sub formulae I-1 to I-20 as well as their mirror images,

| | |
|---|---|
| -Phe- | I-1 |
| -Pyd- | I-2 |
| —Pyr— | I-3 |
| -PheL- | I-4 |
| -Cyc- | I-5 |
| -Phe-Z-Cyc- | I-6 |
| -Cyc-Z-Cyc- | I-7 |
| -PheL-Cyc- | I-8 |
| -Phe-Z-Phe- | I-9 |
| -Phe-Z-Pyd- | I-10 |
| -Pyd-Z-Phe- | I-11 |
| -Phe-Z-Pyr— | I-12 |
| —Pyr-Z-Phe- | I-13 |
| -PheL-Z-Phe- | I-14 |
| -PheL-Z-Pyd- | I-15 |
| -PheL-Z-Pyr— | I-16 |
| —Pyr-Z-Pyd- | I-17 |
| -Pyd-Z-Pyd- | I-18 |
| —Pyr-Z-Pyr— | I-19 |
| -PheL-Z-PheL- | I-20 |

In these preferred groups Z has the meaning of Z$^{11}$ as given in formula I. Preferably Z is —COO—, —OCO—, —CH$_2$CH$_2$—, —C≡C— or a single bond.

Very preferably the group

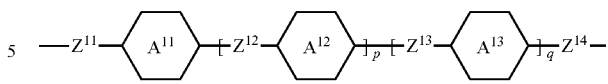

is selected from the following formulae Ia to Ij and their mirror images

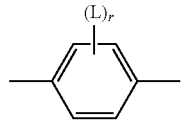
Ia

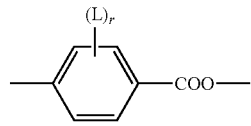
Ib

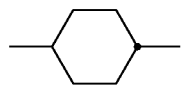
Ic

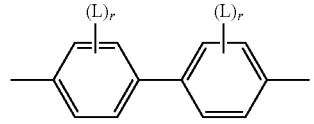
Id

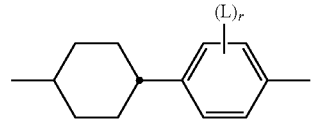
Ie

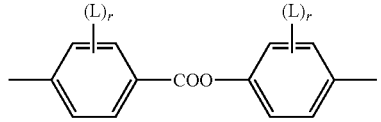
If

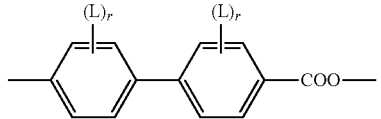
Ig

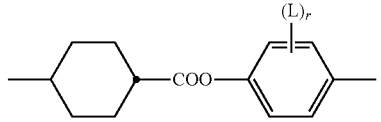
Ih

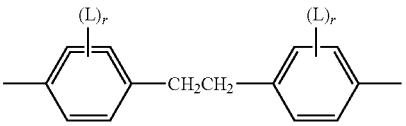
Ii

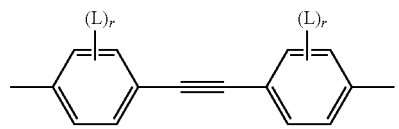
Ij wherein L is F, Cl, Br, CN, OH, NO$_2$, and/or an alkyl, alkoxy, alkylcarbonyl or alkoxycarbonyl group with 1 to 12 C atoms, wherein one or more H atoms are optionally replaced by F or Cl and r is 0, 1, 2, 3 or 4, preferably 0, 1 or 2.

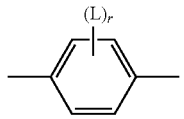

in these preferred formulae is very preferably

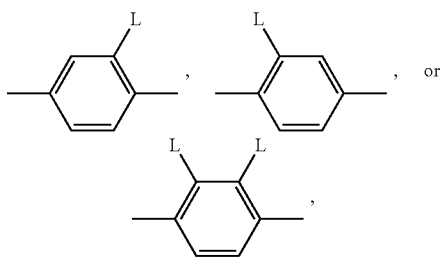

furthermore

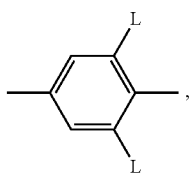

with L having each independently one of the meanings given above.

Especially preferred compounds of formula I comprise at least one group

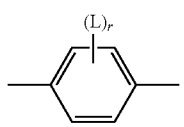

wherein r is 1 or 2

Further preferred compounds of formula I comprise at least two groups

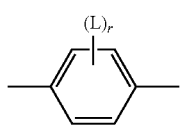

wherein r is 1 and/or at least one group

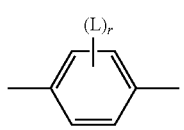

wherein r is 2.

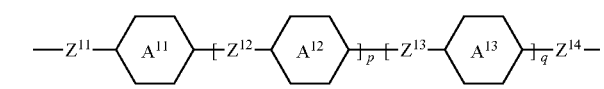

preferably is

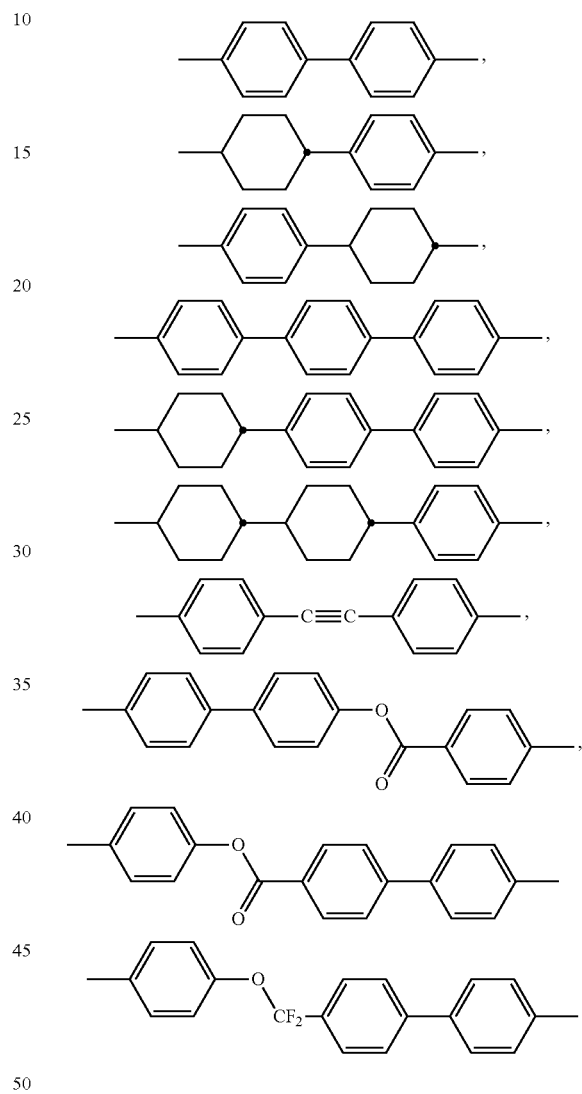

wherein the 1,4-phenylene rings may optionally be substituted by R, preferably by alkyl, preferably by methyl, and/or by alkoxy and/or by halogen, preferably F.

More preferably

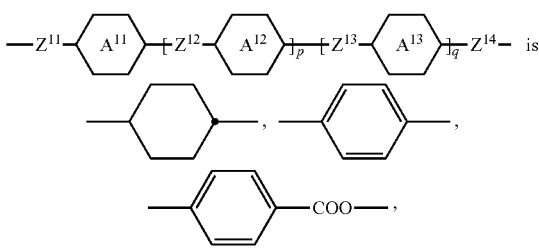

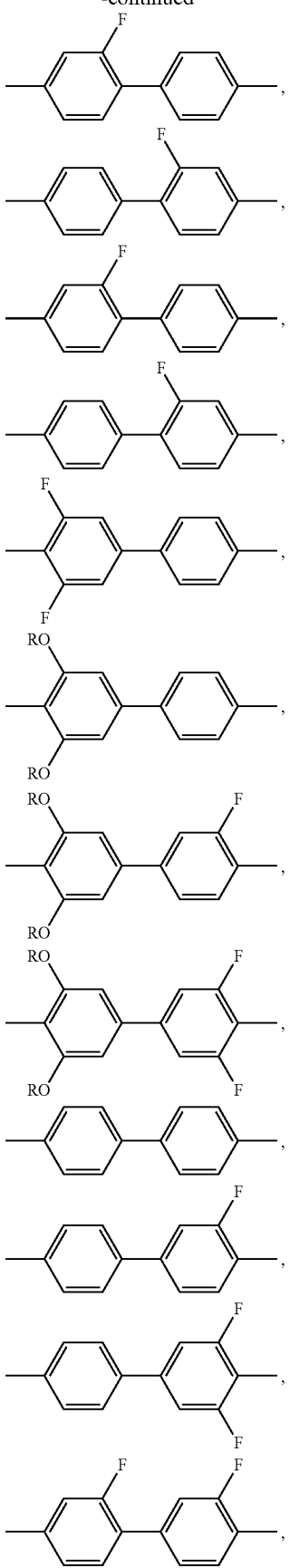
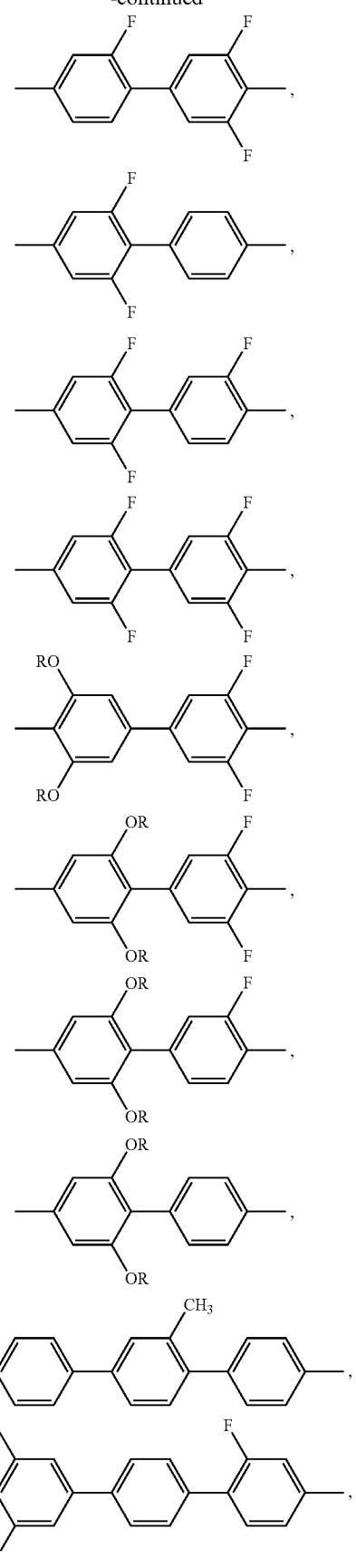

-continued

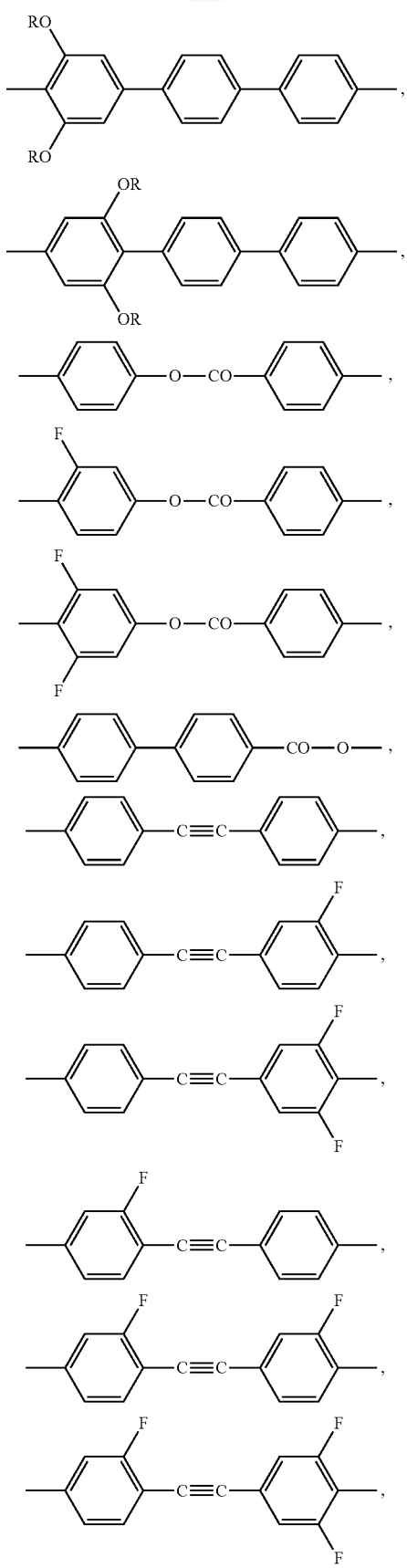

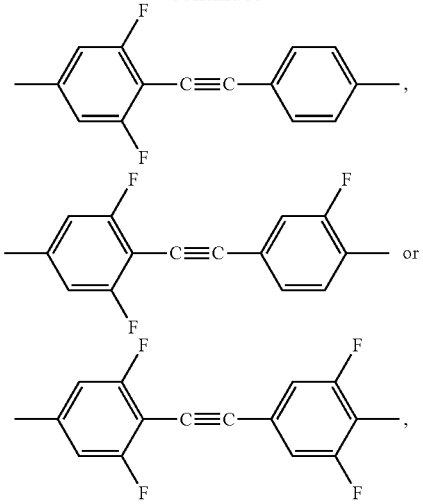

or their mirror images
wherein R has the meaning given above and preferably is alkyl, preferably with 1 to 6 C-atoms, preferably n-alkyl, wherein one or more non-adjacent —CH$_2$-groups optionally may be replaced by —O— and/or by —CH=CH— and/or one or more H-atoms may be replaced by halogen, preferably by F.

An alkyl or an alkoxy radical, i.e. an alkyl where the terminal CH$_2$ group is replaced by —O—, in this application may be straight-chain or branched. It is preferably straight-chain, has 1, 2, 3, 4, 5, 6, 7 or 8 carbon atoms and accordingly is preferably methyl, ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, nonoxy, decoxy, undecoxy, dodecoxy, tridecoxy or tetradecoxy, for example.

Oxaalkyl, i.e. an alkyl group in which one non-terminal CH$_2$ group is replaced by —O—, is preferably straight-chain 2-oxapropyl (=methoxy-methyl), 2-(=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-, 7-, 8- or 9-oxadecyl, for example.

An alkenyl group, i.e. an alkyl group wherein one or more CH$_2$ groups are replaced by —CH=CH—, may be straight-chain or branched. It is preferably straight-chain, has 2 to 10 C atoms and accordingly is preferably vinyl, prop-1-, or prop-2-enyl, but-1-, 2- or but-3-enyl, pent-1-, 2-, 3- or pent-4-enyl, hex-1-, 2-, 3-, 4- or hex-5-enyl, hept-1-, 2-, 3-, 4-, 5- or hept-6-enyl, oct-1-, 2-, 3-, 4-, 5-, 6- or oct-7-enyl, non-1-, 2-, 3-, 4-, 5-, 6-, 7- or non-8-enyl, dec-1-, 2-, 3-, 4-, 5-, 6-, 7-, 8- or dec-9-enyl.

Especially preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples for particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 C atoms are generally preferred.

In an alkyl group, wherein one CH$_2$ group is replaced by —O— and one by —CO—, these radicals are preferably neighboured. Accordingly these radicals together form a carbonyloxy group —CO—O— or an oxycarbonyl group —O—CO—. Preferably such an alkyl group is straight-chain and has 2 to 6 C atoms.

It is accordingly preferably acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxy-ethyl, 2-butyryloxyethyl, 3-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxy-carbonylmethyl, propoxycarbonylmethyl, butoxycarbonylmethyl, 2-(methoxycarbonyl)ethyl, 2-(ethoxycarbonyl)ethyl, 2-(propoxy-carbonyl)ethyl, 3-(methoxycarbonyl)propyl, 3-(ethoxycarbonyl)propyl, 4-(methoxycarbonyl)-butyl.

An alkyl group wherein two or more $CH_2$ groups are replaced by —O— and/or —COO—, it can be straight-chain or branched. It is preferably straight-chain and has 3 to 12 C atoms. Accordingly it is preferably bis-carboxymethyl, 2,2-bis-carboxy-ethyl, 3,3-bis-carboxy-propyl, 4,4-bis-carboxy-butyl, 5,5-bis-carboxy-pentyl, 6,6-bis-carboxy-hexyl, 7,7-bis-carboxy-heptyl, 8,8-bis-carboxy-octyl, 9,9-bis-carboxy-nonyl, 10,10-bis-carboxy-decyl, bis-(methoxycarbonyl)-methyl, 2,2-bis-(methoxycarbonyl)-ethyl, 3,3-bis-(methoxycarbonyl)-propyl, 4,4-bis-(methoxycarbonyl)-butyl, 5,5-bis-(methoxycarbonyl)-pentyl, 6,6-bis-(methoxycarbonyl)-hexyl, 7,7-bis-(methoxycarbonyl)-heptyl, 8,8-bis-(methoxycarbonyl)-octyl, bis-(ethoxycarbonyl)-methyl, 2,2-bis-(ethoxycarbonyl)-ethyl, 3,3-bis-(ethoxycarbonyl)-propyl, 4,4-bis-(ethoxycarbonyl)-butyl, 5,5-bis-(ethoxycarbonyl)-hexyl.

A alkyl or alkenyl group that is monosubstituted by CN or $CF_3$ is preferably straight-chain. The substitution by CN or $CF_3$ can be in any desired position.

An alkyl or alkenyl group that is at least monosubstituted by halogen, it is preferably straight-chain. Halogen is preferably F or Cl, in case of multiple substitution preferably F. The resulting groups include also perfluorinated groups. In case of monosubstitution the F or Cl substituent can be in any desired position, but is preferably in ω-position. Examples for especially preferred straight-chain groups with a terminal F substituent are fluormethyl, 2-fluorethyl, 3-fluorpropyl, 4-fluorbutyl, 5-fluorpentyl, 6-fluorhexyl and 7-fluorheptyl. Other positions of F are, however, not excluded.

Halogen means F, Cl, Br and I and is preferably F or Cl, most preferably F.

Each of $R^{11}$ to $R^{14}$ may be a polar or a non-polar group. In case of a polar group, it is preferably selected from CN, $SF_5$, halogen, $OCH_3$, SCN, $COR^5$, $COOR^5$ or a mono-oligo- or polyfluorinated alkyl or alkoxy group with 1 to 4 C atoms. $R^5$ is optionally fluorinated alkyl with 1 to 4, preferably 1 to 3 C atoms. Especially preferred polar groups are selected of F, Cl, CN, $OCH_3$, $COCH_3$, $COC_2H_5$, $COOCH_3$, $COOC_2H_5$, $CF_3$, $CHF_2$, $CH_2F$, $OCF_3$, $OCHF_2$, $OCH_2F$, $C_2F_5$ and $OC_2F_5$, in particular F, Cl, CN, $CF_3$, $OCHF_2$ and $OCF_3$. In case of a non-polar group, it is preferably alkyl with up to 15 C atoms or alkoxy with 2 to 15 C atoms.

Each of $R^{11}$ and $R^{12}$ may be an achiral or a chiral group. In case of a chiral group it is preferably of formula I*:

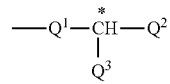

wherein $Q^1$ is an alkylene or alkylene-oxy group with 1 to 9 C atoms or a single bond, $Q^2$ is an alkyl or alkoxy group with 1 to 10 C atoms which may be unsubstituted, mono- or polysubstituted by F, Cl, Br or CN, it being also possible for one or more non-adjacent $CH_2$ groups to be replaced, in each case independently from one another, by —O—, —S—, —NH—, —N($CH_3$)—, —CO—, —COO—, —OCO—, —OCO—O—, —S—CO— or —CO—S— in such a manner that oxygen atoms are not linked directly to one another, $Q^3$ is F, Cl, Br, CN or an alkyl or alkoxy group as defined for $Q^2$ but being different from $Q^2$.

In case $Q^1$ in formula I* is an alkylene-oxy group, the O atom is preferably adjacent to the chiral C atom.

Preferred chiral groups of formula I* are 2-alkyl, 2-alkoxy, 2-methylalkyl, 2-methylalkoxy, 2-fluoroalkyl, 2-fluoroalkoxy, 2-(2-ethin)-alkyl, 2-(2-ethin)-alkoxy, 1,1,1-trifluoro-2-alkyl and 1,1,1-trifluoro-2-alkoxy.

Particularly preferred chiral groups I* are 2-butyl (=1-methylpropyl), 2-methylbutyl, 2-methylpentyl, 3-methylpentyl, 2-ethylhexyl, 2-propylpentyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-hexyl, 2-octyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chlorpropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, 1,1,1-trifluoro-2-octyloxy, 1,1,1-trifluoro-2-octyl, 2-fluoromethyloctyloxy for example. Very preferred are 2-hexyl, 2-octyl, 2-octyloxy, 1,1,1-trifluoro-2-hexyl, 1,1,1-trifluoro-2-octyl and 1,1,1-trifluoro-2-octyloxy.

In addition, compounds containing an achiral branched alkyl group may occasionally be of importance, for example, due to a reduction in the tendency towards crystallization. Branched groups of this type generally do not contain more than one chain branch. Preferred achiral branched groups are isopropyl, isobutyl (=methylpropyl), isopentyl (=3-methylbutyl), isopropoxy, 2-methyl-propoxy and 3-methylbutoxy.

The polymerisable or reactive group $PG^{11}$ is preferably selected from $CH_2$=$CW^1$—COO—,

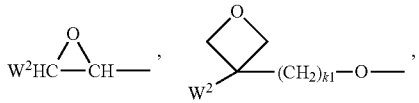

$CH_2$=$CW^2$—(O)$_{k1}$—, $CH_3$—CH=CH—O—, $(CH_2$=CH$)_2$ CH—OCO—, $(CH_2$=CH—$CH_2)_2$CH—OCO—, $(CH_2$=CH$)_2$CH—O—, $(CH_2$=CH—$CH_2)_2$N—, HO—$CW^2W^3$—, HS—$CW^2W^3$—, H$W^2$N—, HO—$CW^2W^3$—NH—, $CH_2$=$CW^1$—CO—NH—, $CH_2$=CH—$(COO)_{k1}$-Phe-$(O)_{k2}$—, Phe-CH=CH—, HOOC—, OCN—, and $W^4W^5W^6$Si—, with $W^1$ being H, Cl, CN, phenyl or alkyl with 1 to 5 C-atoms, in particular H, Cl or $CH_3$, $W^2$ and $W^3$ being independently of each other H or alkyl with 1 to 5 C-atoms, in particular methyl, ethyl or n-propyl, $W^4$, $W^5$ and $W^6$ being independently of each other Cl, oxaalkyl or oxacarbonylalkyl with 1 to 5 C-atoms, Phe being 1,4-phenylene and $k_1$ and $k_2$ being independently of each other 0 or 1.

Especially preferably $PG^{11}$ is a vinyl group, an acrylate group, a methacrylate group, an oxetane group or an epoxy group, especially preferably an acrylate or methacrylate group.

As for the spacer group $SG^{11}$ all groups can be used that are known for this purpose to those skilled in the art. The spacer group $SG^{11}$ is preferably of formula SG'-X, such that $PG^{11}$-$SG^{11}$- is $PG^{11}$-SG'-X—, wherein SG' is alkylene with up to 20 C atoms which may be unsubstituted, mono- or poly-substituted by F, Cl, Br, I or CN, it being also possible for one or more non-adjacent $CH_2$ groups to be replaced, in each case independently from one another, by —O—, —S—, —NH—, —$NR^{01}$—, —$SiR^{01}R^{02}$—, —CO—, —COO—, —OCO—, —OCO—O—, —S—, —CO—, —CO—S—, —CH=CH— or —C≡C— in such a manner that O and/or S atoms are not linked directly to one another, X is —O—, —S—, —CO—, —COO—, —OCO—, —O—COO—, —CO—$NR^{01}$—, —$NR^{01}$—CO—, —$OCH_2$—, —$CH_2O$—, —$SCH_2$—, —$CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH=N—, —N=CH—, —N=N—, —CH=$CR^{01}$—, $CY^{01}$=$CY^{02}$, —C≡C—, —CH=CH—COC—, —OCO—, —CH=CH— or a single bond, and $R^{01}$, $R^{02}$, $Y^{01}$ and $Y^{02}$ have one of the respective meanings given above.

X is preferably —O—, —S—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$CF_2CH_2$—, —$CH_2CF_2$—, —$CF_2CF_2$—, —CH=N—, —N=CH—, —N=N—, —CH=$CR^0$—, —$CY^{02}$=$CY^{02}$—, —C≡C— or a single bond, in particular —O—, —S—, —C≡C—, —$CY^{01}$=$CY^{02}$— or a single bond, very preferably a group that is able to from a conjugated system, such as —C≡C— or —$CY^{01}$=$CY^{02}$—, or a single bond.

Typical groups SG' are, for example, —$(CH_2)_p$—, —$(CH_2CH_2O)_q$—$CH_2CH_2$—, —$CH_2CH_2$—S—$CH_2CH_2$— or —$CH_2CH_2$—NH—$CH_2CH_2$— or —$(SiR^0R^{00}$—$O)_p$—, with p being an integer from 2 to 12, q being an integer from 1 to 3 and $R^0$, $R^{00}$ and the other parameters having the meanings given above.

Preferred groups SG' are ethylene, propylene, butylene, pentylene, hexylene, heptylene, octylene, nonylene, decylene, undecylene, dodecylene, octadecylene, ethylene-oxyethylene, methyleneoxybutylene, ethylene-thioethylene, ethylene-N-methyl-iminoethylene, 1-methylalkylene, ethenylene, propenylene and butenylene for example.

In another preferred embodiment SG' is a chiral group of formula I*':

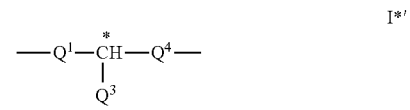

wherein
$Q^1$ and $Q^3$ have the meanings given in formula I*, and
$Q^4$ is an alkylene or alkylene-oxy group with 1 to 10 C atoms or a single bond, being different from $Q^1$, with $Q^1$ being linked to the polymerisable group PG.

Further preferred are compounds with one or two groups $PG^{11}$-$SG^{11}$- wherein $SG^{11}$ is a single bond.

In case of compounds with two groups $PG^{11}$-$SG^{11}$, each of the two polymerisable groups PG and the two spacer groups SG can be identical or different.

Comprising in this application means in the context of compositions that the entity referred to, e.g. the medium or the component, contains the compound or compounds in question, preferably in a total concentration of 10% or more and most preferably of 20% or more.

Predominantly consisting, in this context, means that the entity referred to contains 80% or more, preferably 90% or more and most preferably 95% or more of the compound or compounds in question.

Entirely consisting, in this context, means that the entity referred to contains 98% or more, preferably 99% or more and most preferably 100.0% of the compound or compounds in question.

The concentration of the compounds of formula IA according to the present application are contained in the media according to the present application preferably is in the range from 0.5% or more to 30% or less, more preferably in the range from 1% or more to 20% or less and most preferably in the range from 5% or more to 12% or less.

The concentration of the compounds of formula IB according to the present application are contained in the media according to the present application preferably is in the range from 0.5% or more to 30% or less, more preferably in the range from 1% or more to 20% or less and most preferably in the range from 5% or more to 12% or less.

Exemplary compounds of formula IA, which can be beneficially used according to the present invention, are those of sub-formulae IA-1 to IA-7

IA-1

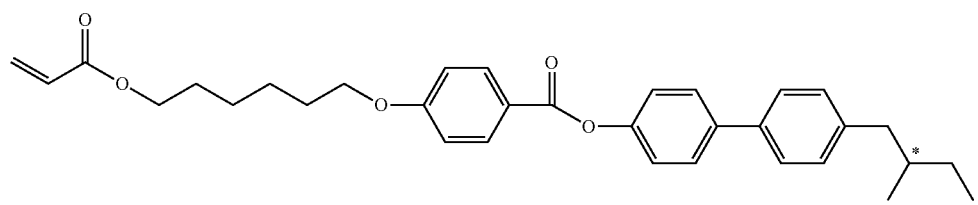

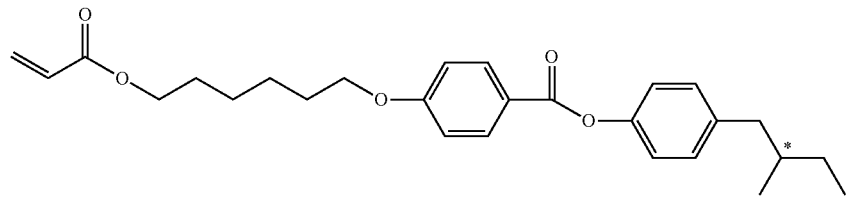
IA-2

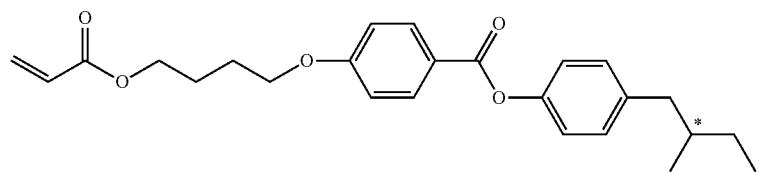
IA-3

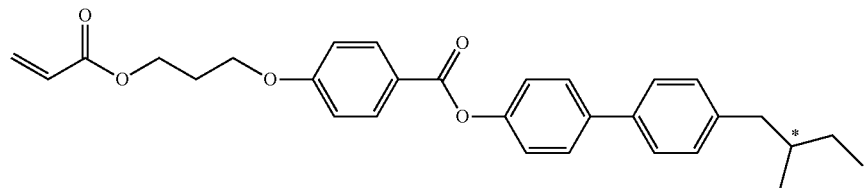
IA-4

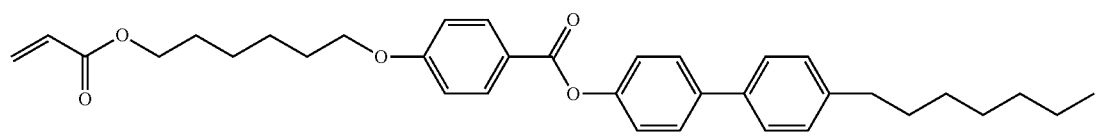
IA-5

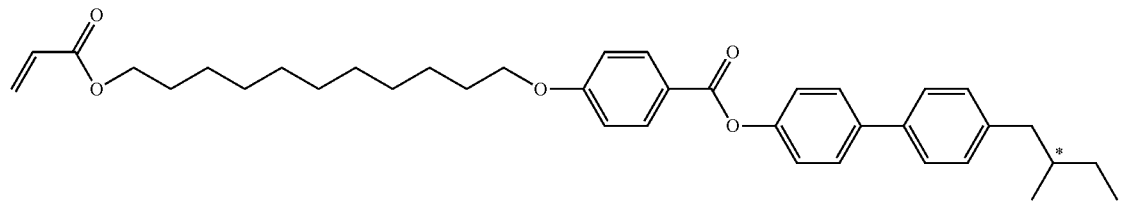
IA-6

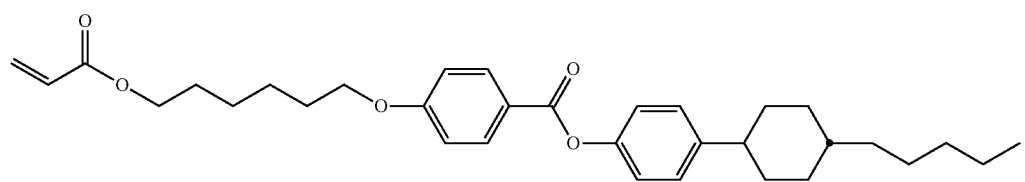
IA-7

These compounds as pure substances have the phase sequences detected by DSC which are given in the following table, table a.

TABLE a

Phase sequences of mono-reactive mesogens

| Compound No. | Phase sequence T/° C. |
|---|---|
| IA-1 | K 81 Ch 128 I |
| IA-2 | K 35 ($S_A$-8) I [Ch-1.2 I] |
| IA-3 | K 38.5 ($^{N*}/_{SA}$-3.2) I [N −1.14 I by DSC] |
| IA-4 | K 89.0 N* |
| IA-5 | K 66 $S_X$ 71 S 129 N 151 I |
| IA-6 | K 60.4 $S_A$ 96.2 Ch 119.6 I |
| IA-7 | K 73.3 $S_A$ 102 N 151 I |

Exemplary compounds of formula IB, which can be beneficially used according to the present invention, are those of sub-formulae iB-1 to IB-7

IB-1
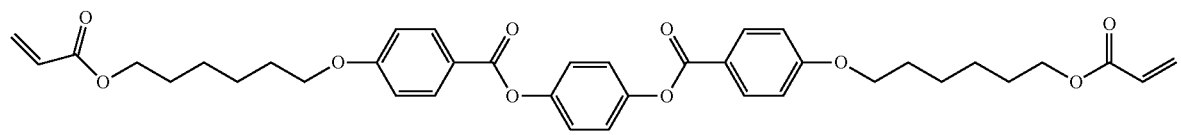
IB-2
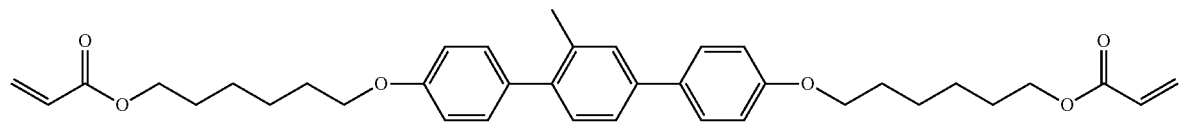
IB-3
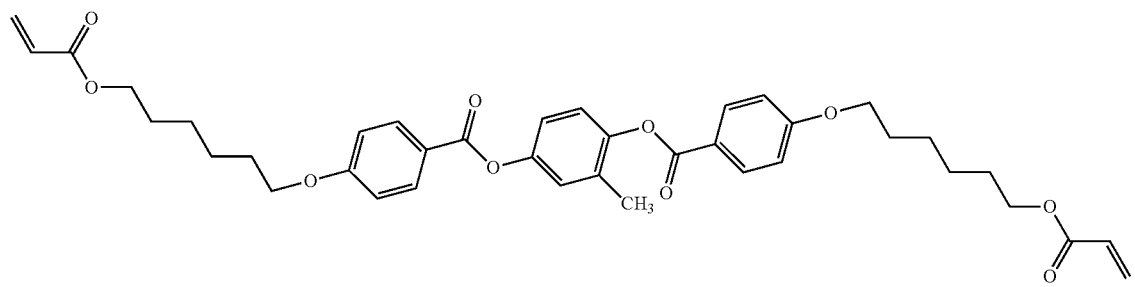
IB-4
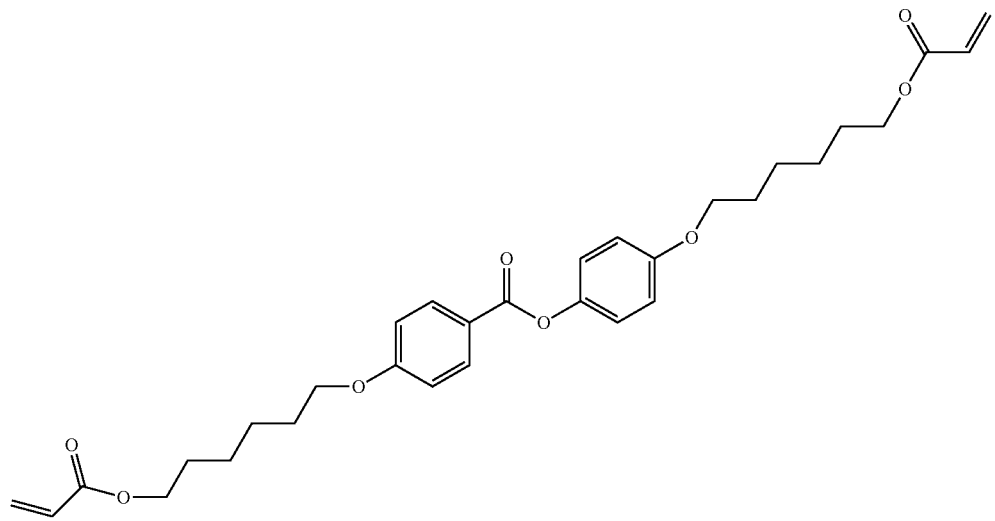
IB-5
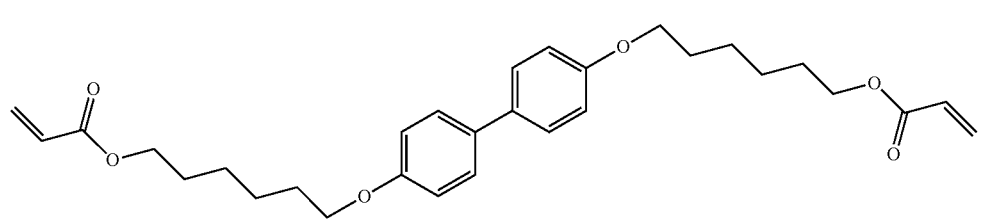

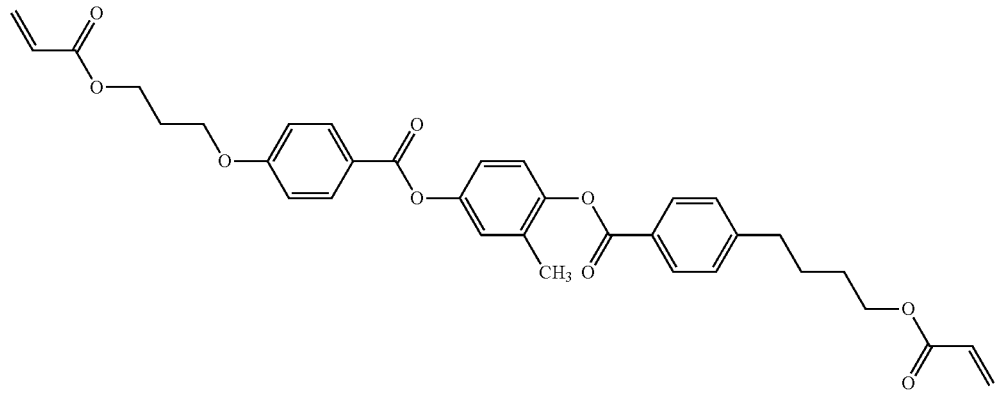

IB-6

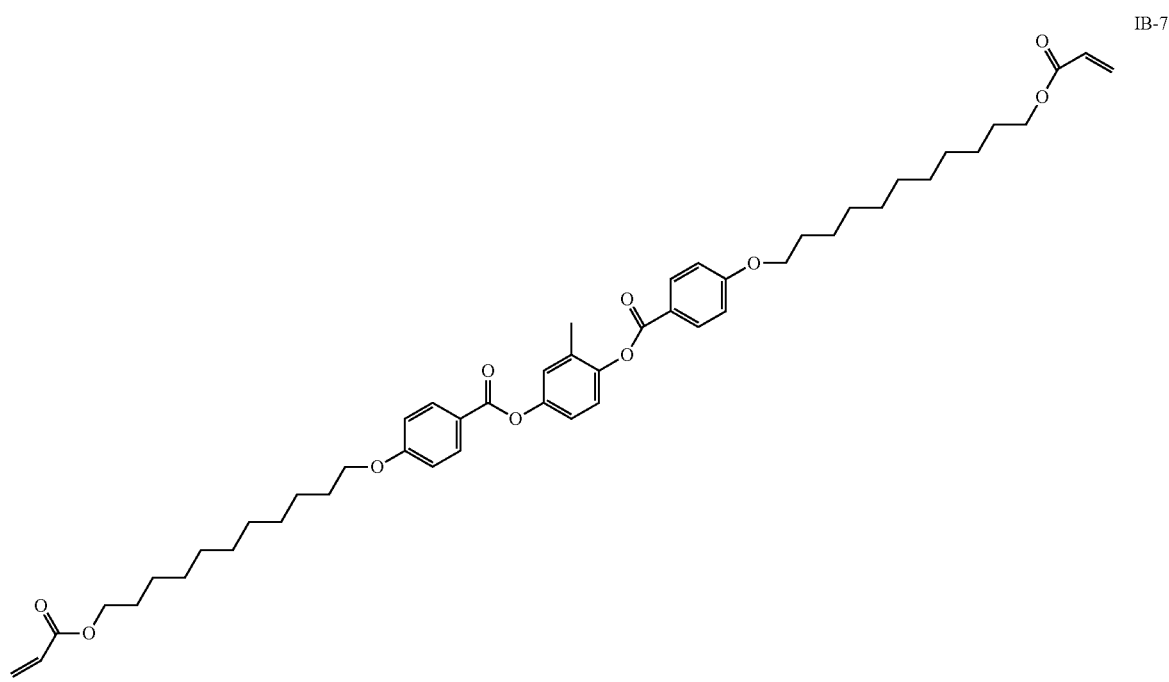

IB-7

These compounds as pure substances have the phase sequences detected by DSC, which are given in the following table, table b.

TABLE b

Phase sequences of di-reactive mesogens

| Compound No. | Phase sequence T/° C. |
| --- | --- |
| IB-1 | K 78 N 103 I |
| IB-2 | K 68 $S_A$ 75 N 79 I |
| IB-3 | K 88 N 118 I |
| IB-4 | K 61 (N 48) I |
| IB-5 | K 83 I |
| IB-6 | K 66 N 127 I |
| IB-7 | K 78 N 103 I |

The compounds of formulae IA-1 to IA-6 and IB-1 to IB-7 are easily accessible and available from Merck KGaA.

In a preferred embodiment the mesogenic modulation media according to the instant invention comprise a polymeric material obtained or obtainable from a mixture of polymer precursors comprising
  a component I comprising one or more mesogenic mono-reactive monomers and/or
  a component II comprising one or more mono-reactive mesogenic monomers.

Preferably the mixture of polymer precursors has the same or almost the same transition temperature or temperatures, in particular the same clearing point and/or transition temperature from the cholesteric phase to the blue phase (T(Ch,BP) also called T(N*,BP)) and/or transition temperature from the blue phase to the isotropic phase (T(BP,I)), or leads to no or only to a limited change of one or more of these temperatures during the process of its polymerisation.

Preferably the precursor of the polymer comprises
one or more mono-reactive mesogenic monomers having
one or more of the transition temperatures mentioned
directly above, which are above the respective values of
the mesogenic host mixture, component B of the systems, respectively leading to a decrease of the respective temperature during the process of polymerisation,
and having one or more of the said respective transition
temperatures, which are below the respective values of
the mesogenic host mixture, component B of the systems, respectively leading to an increase of the respective temperature during the process of polymerisation.

In a preferred embodiment the mono-reactive polymer precursors having transition temperatures, e.g. a clearing point below that of the mesogenic host mixture, respectively leading to an increase of the transiton temperatures during the process of polymerisation, are nonmesogenic compounds.

In another preferred embodiment of the present invention the polymer precursor comprises
one mono-reactive mesogenic monomer, which having a clearing point, which is identical are at least almost identical to that of the mesogenic host mixture, respectively leading to no or almost no decrease of the said respective transition temperature or temperatures during the process of polymerisation.

Preferably the Blue Phase of the low molecular weight component, component B in the system with the polymerized polymer precursor extends from 30° C. or less to 70° or more, more preferably from 20° C. or less to 70° or more, more preferably from 0° C. or less to 80° or more and most preferably from −20° C. or less to 80° or more.

In a preferred embodiment the mesogenic modulation media according to the instant invention comprise
a component A, preferably in a concentration of 1% to 25% by weight, comprising, preferably predominantly consisting of and most preferably entirely consisting of, one compound or more compounds of the formula I given above and optionally a dielectrically positive component B comprising, preferably predominantly consisting of and most preferably entirely consisting of one compound or of more compounds of formula II

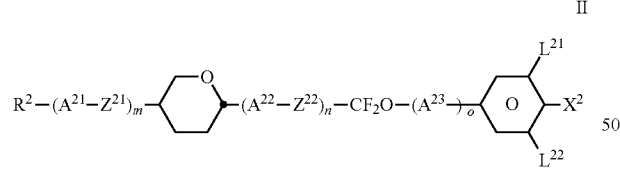

II wherein $R^2$ has the meaning given under formula I for $R^{11}$, $A^{21}$, $A^{22}$ and $A^{23}$ are, each independently of each other,

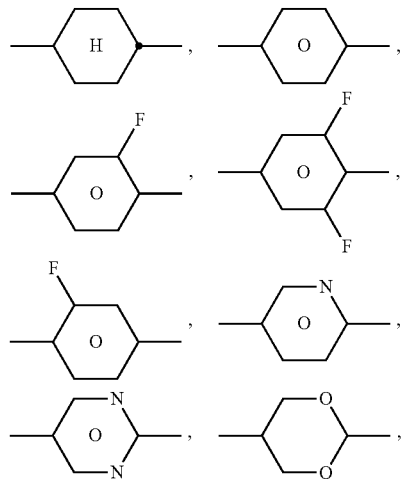

whereby each of $A^{21}$ and $A^{22}$ may have the same or a different meaning if present twice, $Z^{21}$ and $Z^{22}$ are, each independently of each other, a single bond, —(CH$_2$)$_4$—, —CH$_2$CH$_2$—, —CF$_2$—CF$_2$—, —CF$_2$—CH$_2$—, —CH$_2$—CF$_2$—, —CH=CH—, —CF=CF—, —CF=CH—, —(CH$_2$)$_3$O—, —O(CH$_2$)$_3$—, —CH=CF—, —C≡C—, —CH$_2$O—, —OCH$_2$—, —CF$_2$O—, —OCF$_2$—, —CO—O— or —O—CO—, whereby each of $Z^{21}$ and $Z^{22}$ may have the same or a different meaning if present twice, $X^2$ is halogen, —CN, —NCS, —SF$_5$, —SO$_2$CF$_3$, alkyl, alkenyl, alkenyloxy or alkylalkoxy or alkoxy radical each mono- or polysubstituted by CN and/or halogen, $L^{21}$ and $L^{22}$ are, each independently of each other, H or F, and m is 0, 1 or 2, n iso, 1, 2 or 3, o is 0, 1 or 2, preferably 0 or 1 and m+n+o is 3 or less, preferably 2 or less, optionally a component C, preferably in a concentration of 1% to 25% by weight, comprising, preferably predominantly consisting of and most preferably entirely consisting of one compound or of more compounds of formula III

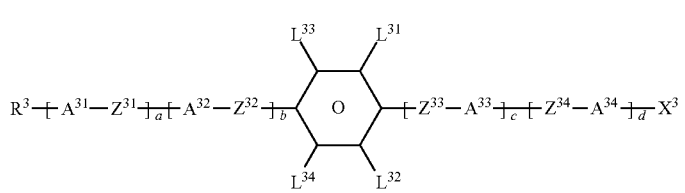

III wherein
a, b, c and d are each independently of each other 0, 1 or 2, whereby
a+b+c+d is 4 or less,
$A^{31}$, $A^{32}$, $A^{33}$ and $A^{34}$ are, each independently of each other,

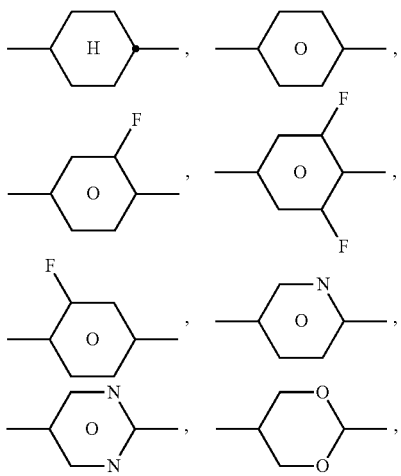

whereby each of $A^{31}$, $A^{32}$, $A^{33}$ and $A^{34}$ may have the same or a different meaning if present twice,
$Z^{31}$, $Z^{32}$, $Z^{33}$ and $Z^{34}$ are, each independently of each other, a single bond, —(CH$_2$)$_4$—, —CH$_2$CH$_2$—, —CF$_2$—CF$_2$—, —CF$_2$—CH$_2$—, —CH$_2$—CF$_2$—, —CH=CH—, —CF=CF—, —CF=CH—, —(CH$_2$)$_3$O—, —O(CH$_2$)$_3$—, —CH=CF—, —C≡D—, —CH$_2$O—, —OCH$_2$—, —CF$_2$O—, —OCF$_2$—, —CO—O— or —O—CO—, whereby each of $Z^{31}$, $Z^{32}$, $Z^{33}$ and $Z^{34}$ may have the same or a different meaning if present twice,
$R^3$ is an alkyl or alkoxy radical having from 1 to 15 carbon atoms, wherein one or more methylene groups of said alkyl or alkoxy radical may be replaced independently of each other by —O—, —S—, —SiR$^x$R$^y$—, —CH=CH—, —C≡D—, —CO—O— and/or —O—CO— such that oxygen and/or sulfur atoms are not linked directly to each other, said alkyl or alkoxy radical being unsubstituted or mono-substituted with a —CN group or mono- or poly-substituted with halogen, preferably $R^{11}$ is a straight-chain alkyl, alkoxy, alkenyl, alkenyloxy or —O-alkylene-O-alkyl radical with up to 10 carbon atoms, said radicals being unsubstituted or mono- or poly-substituted with halogen,
$L^{31}$, $L^{32}$, $L^{33}$ and $L^{34}$ are each independently of each other hydrogen, halogen, a CN group, an alkyl or alkoxy radical having from 1 to 15 carbon atoms wherein one or more methylene groups of said alkyl or alkoxy radical may be replaced independently of each other by —O—, —S—, —SiR$^x$R$^y$—, —CH=CH—, —C≡D—, —CO—O— and/or —O—CO— such that oxygen and/or sulfur atoms are not linked directly to each other, said alkyl or alkoxy radical being unsubsti-tuted or mono-substituted with a —CN group or mono- or poly-substituted with halogen, with the proviso that at least one of $L^{31}$, $L^{32}$, $L^{33}$ and $L^{34}$ is not hydrogen, $X^3$ is F, Cl, CF$_3$, OCF$_3$, CN, NCS, —SF$_5$ or —SO$_2$—R$^z$,
$R^x$ and $R^y$ are independently of each other hydrogen or an alkyl radical having from 1 to 7 carbon atoms; preferably $R^x$ and $R^y$ are both methyl, ethyl, propyl or butyl, and
$R^z$ is an alkyl radical having from 1 to 7 carbon atoms, said alkyl radical being unsubstituted or mono- or poly-substituted with halogen; preferably $R^z$ is CF$_3$, C$_2$F$_5$ or n-C$_4$F$_9$ and
1-20% by weight of component D comprising one chiral compound or more chiral compounds with a HTP of ≥20 μm.

The inventive mixtures contain 1-25 wt. %, preferably 2-20 wt. % and most preferably 3-15 wt. % of component A.

Suitable chiral compounds of component D are those, which have an absolute value of the helical twisting power of 20 μm or more, preferably of 40 μm or more and most preferably of 60 μm or more. The HTP is measured in MLD-6260 at a temperature of 20° C.

The chiral component D comprises preferably one or more chiral compounds which have a mesogenic structure and exhibit preferably one or more mesophases themselves, particularly at least one cholesteric phase. Preferred chiral compounds being comprised in the chiral component D are, inter alia, well known chiral dopants like cholesteryl-nonanoate (CN), R/S-811, R/S-1011, R/S-2011, R/S-3011, R/S-4011, R/S-5011, CB-15 (Merck KGaA, Darmstadt, Germany). Preferred are chiral dopants having one or more chiral moieties and one or more mesogenic groups or having one or more aromatic or alicyclic moieties forming, together with the chiral moiety, a mesogenic group. More preferred are chiral moieties and mesogenic chiral compounds disclosed in DE 34 25 503, DE 35 34 777, DE 35 34 778, DE 35 34 779, DE 35 34 780, DE 43 42 280, EP 01 038 941 and DE 195 41 820 that disclosure is incorporated within this application by way of reference. Particular preference is given to chiral binaphthyl derivatives as disclosed in EP 01 111 954.2, chiral binaphthol derivatives as disclosed in WO 02/34739, chiral TADDOL derivatives as disclosed in WO 02/06265 as well as chiral dopants having at least one fluorinated linker and one end chiral moiety or one central chiral moiety as disclosed in WO 02/06196 and WO 02/06195.

The controlling medium of the present invention has a characteristic temperature, preferably a clearing point, in the range from about −30° C. to about 80° C., especially up to about 55° C.

The inventive mixtures contain one ore more (two, three, four or more) chiral compounds in the range of 1-25 wt. %, preferably 2-20 wt. %.

Especially preferred are mixtures containing 3-15 wt. % of a chiral compound.

Preferred embodiments are indicated below:
The medium comprises one, two or more compounds of formula I;
Component B preferably contains besides one compound ore more compounds of formula II one ester compound or more ester compounds of the formula Z

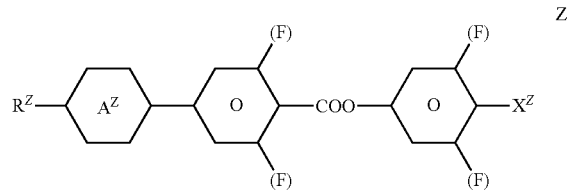

wherein $R^Z$ has the meaning given under formula I for $R^{11}$,

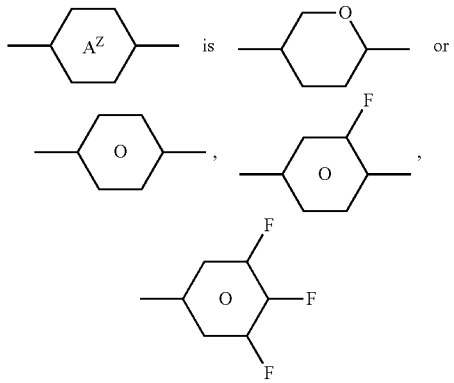

$X^Z$ is F, Cl, CN, NCS, $OCF_3$, $CF_3$ or $SF_5$.
wherein $R^Z$ has the meaning given under formula II for $R^2$.

Especially preferred are mixtures containing 5% to 35%, preferably 10% to 30% and especially preferred 10% to 20% of compounds of formula Z.

The component B preferably contains additionally one or more compounds of formula N

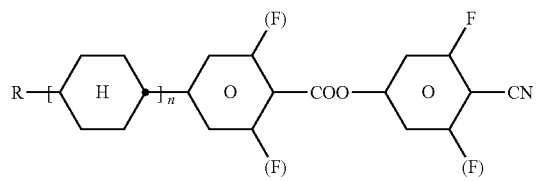

wherein
R has the meaning given under formula I for $R^{11}$ and preferably is alkyl or Alkyl-C≡C,
"Alkyl" is alkyl with 1 to 7 C-atoms, preferably n-alkyl, and
n is 0 or 1.

The component B preferably additionally comprises one or more compounds selected from the group of ester compounds of formulae E

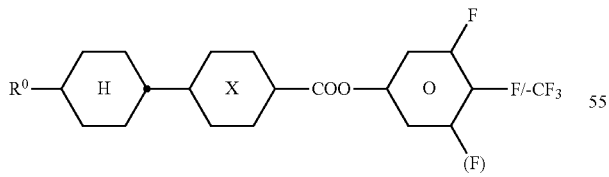

in which $R^0$ has the meaning given for $R^{11}$ under formula I and preferably is alkyl and

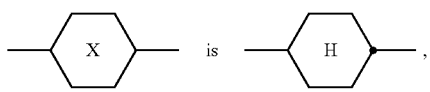

-continued

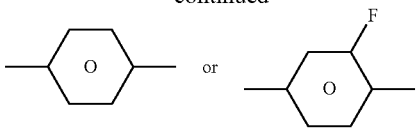

The proportion of the compounds of the formulae E is preferably 10-30% by weight, in particular 15% to 25%.

The medium preferably comprises one compound or more compounds selected from the group of formulae Q-1 and Q-2

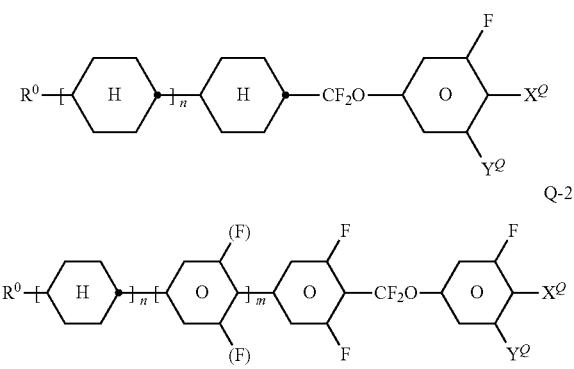

wherein $R^0$ has the meaning given for $R^{11}$ under formula I and n and m are, independently of each other 0 or 1.

The medium preferably comprises one compound or more compounds selected from the group of compounds of formulae II in which $R^0$ is methyl.

The medium preferably comprises one dioxane compound, two or more dioxane compounds, preferably one dioxane compound or two dioxane compounds, selected from the group of formulae Dx-1 and Dx-2

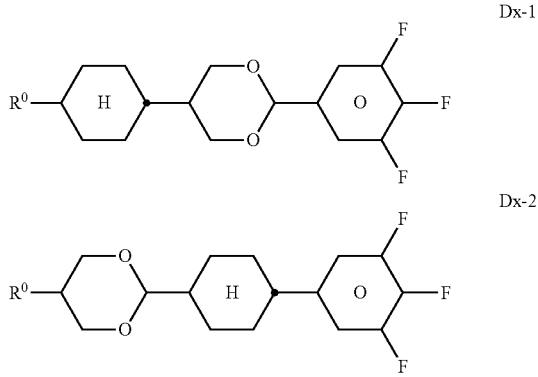

wherein $R^0$ has the meaning given for $R^{11}$ under formula I.

It has been found that even a relatively small proportion of compounds of the formulae I mixed with conventional liquid-crystal materials, but in par-ticular with one or more compounds of the formulae II and III, results in a lower operating voltage and a broader operating temperature range. Preference is given, in particular, to mixtures which, besides one or more compounds of the formula I, comprise one or more compounds of the formula II, in particular compounds of the formula II in which $X^2$ is F, Cl, CN, NCS, $CF_3$ or $OCF_3$. The compounds of the formulae I to III are colourless, stable and readily miscible with one another and with other liquid-crystalline materials.

The optimum mixing ratio of the compounds of the formulae I and II and III depends substantially on the desired properties, on the choice of the components of the formulae I, II and/or III, and on the choice of any other components that may be present. Suitable mixing ratios within the range given above can easily be determined from case to case.

The total amount of compounds of the formulae I to III in the mixtures according to the invention is not crucial. The mixtures can therefore comprise one or more further components for the purposes of optimisation of various properties. However, the observed effect on the operating voltage and the operating temperature range is generally greater, the higher the total concentration of compounds of the formulae I to III.

In a particularly preferred embodiment, the media according to the inven-tion comprise compounds of the formula III which $X^3$ is F, $OCF_3$, $OCHF_2$, $OCH=CF_2$, $OCF=CF_2$ or $OCF_2-CF_2H$. A favourable synergistic effect with the compounds of the formulae I results in particularly advantageous prop-erties. In particular, mixtures comprising compounds of formula I and of formula II and of formula III are distinguished by their low operating voltages.

The individual compounds of the formulae II to III and their respective sub-formulae which can be used in the media according to the invention are either known or can be prepared analogously to the known compounds.

The construction of the displays according to the invention from polarisers, electrode base plates and surface-treated electrodes corresponds to the conventional construction for displays of this type. The term conventional construction is broadly drawn here and also covers all derivatives and modifications of the MLC display, in particular including matrix display elements based on poly-Si TFT or MIM, however, particularly preferred are displays, which have electrodes on just one of the substrates, i.e. so called interdigital electrodes, as those used in IPS displays, preferably in one of the established structures.

A significant difference between the displays according to the invention and the conventional displays based on the twisted nematic cell consists, however, in the choice of the liquid-crystal parameters of the liquid-crystal layer.

The media according to the invention are prepared in a manner conven-tional per se. In general, the components are dissolved in one another, advantageously at elevated temperature. By means of suitable additives, the liquid-crystalline phases in accordance with the invention can be modified in such a way that they can be used in all types of liquid crystal display elements that have been disclosed hitherto. Additives of this type are known to the person skilled in the art and are described in detail in the literature (H. Kelker and R. Hatz, Handbook of Liquid Crystals, Verlag Chemie, Weinheim, 1980). For example, pleochroic dyes can be added for the preparation of coloured guest-host systems or substances can be added in order to modify the dielectric anisotropy, the viscosity and/or the alignment of the nematic phases. Furthermore, stabilisers and antioxidants can be added.

The mixtures according to the invention are suitable for TN, STN, ECB and IPS applications and isotropic switching mode (ISM) applications. Hence, their use in an electro-optical device and an electro-optical device containing liquid crystal media comprising at least one compound according to the invention are subject matters of the present invention.

The inventive mixtures are highly suitable for devices which operate in an optically isotropic state. The mixtures of the invention are surprisingly found to be highly suitable for the respective use.

Electro-optical devices that are operated or operable in an optically isotropic state recently have become of interest with respect to video, TV, and multi-media applications. This is because conventional liquid crystal displays utilizing electro-optical effects based on the physical properties of liquid crystals exhibit a rather high switching time, which is undesired for said applications. Furthermore most of the conventional displays show a significant viewing angle dependence of contrast that in turn makes necessary measures to compensate this undesired property.

With regard to devices utilizing electro-optical effects in an isotropic state the German Patent Application DE 102 17 273 A1 for example discloses light controlling (light modulation) elements in which the mesogenic controlling medium for modulation is in the isotropic phase at the operating temperature. These light controlling elements have a very short switching time and a good viewing angle dependence of contrast. However, the driving or operating voltages of said elements are very often unsuitably high for some applications.

German Patent Application DE 102 41 301 yet unpublished describes specific structures of electrodes allowing a significant reduction of the driving voltages. However, these electrodes make the process of manufacturing the light controlling elements more complicated.

Furthermore, the light controlling elements, for example, disclosed in both DE 102 17 273 A1 and DE 102 41 301 show a significant temperature dependence. The electro-optical effect that can be induced by the electrical field in the controlling medium being in an optical isotropic state is most pronounced at temperatures close to the clearing point of the controlling medium. In this range the light controlling elements have the lowest values of their characteristic voltages and, thus, require the lowest operating voltages. As temperature increases the characteristic voltages and hence the operating voltages increase remarkably. Typical values of the temperature dependence are in the range from about a few volts per centigrade up to about ten or more volts per centigrade. While DE 102 41 301 describes various structures of electrodes for devices operable or operated in the isotropic state, DE 102 17 273 A1 discloses isotropic media of varying composition that are useful in light controlling elements operable or operated in the isotropic state. The relative temperature dependence of the threshold voltage in these light controlling elements is at a temperature of 1 centigrade above the clearing point in the range of about 50%/centigrade. That temperature dependence decreases with increasing temperature so that it is at a temperature of 5 centigrade above the clearing point of about 10%/centigrade. However, for many practical applications of displays utilizing said light controlling elements the temperature dependence of the electro-optical effect is too high. To the contrary, for practical uses it is desired that the operating voltages are independent from the operating temperature over a temperature range of at least some centigrades, preferably of about 5 centigrades or more, even more preferably of about 10 centigrades or more and especially of about 20 centigrades or more.

Now it has been found that the use of the inventive mixtures are highly suitable as controlling media in the light controlling elements as described above and in DE 102 17 273 A1, DE 102 41 301 and DE 102 536 06 and broaden the temperature range in which the operating voltages of said electro-optical operates. In this case the optical isotropic state or the blue phase is almost completely or completely independent from the operating temperature.

This effect is even more distinct if the mesogenic controlling media exhibit at least one so-called "blue phase" as described in yet unpublished DE 103 13 979. Liquid crystals having an extremely high chiral twist may have one or more optically isotropic phases. If they have a respective cholesteric pitch, these phases might appear bluish in a cell having a sufficiently large cell gap. Those phases are therefore also called "blue phases" (Gray and Goodby, "Smectic Liquid Crystals, Textures and Structures", Leonhard Hill, USA, Canada (1984)). Effects of electrical fields on liquid crystals existing in a blue phase are described for instance in H. S. Kitzerow, "The Effect of Electric Fields on Blue Phases", Mol. Cryst. Liq. Cryst. (1991), Vol. 202, p. 51-83, as well as the three types of blue phases identified so far, namely BP I, BP II, and BP III, that may be observed in field-free liquid crystals. It is noteworthy, that if the liquid crystal exhibiting a blue phase or blue phases is subjected to an electrical field, further blue phases or other phases different from the blue phases I, II and III might appear.

The inventive mixtures can be used in an electro-optical light controlling element, which comprises
  one or more, especially two substrates;
  an assembly of electrodes;
  one or more elements for polarizing the light; and
  said controlling medium;
whereby said light controlling element is operated (or operable) at a temperature at which the controlling medium is in an optically isotropic phase when it is in a non-driven state.

The operating temperature of the light controlling elements is preferably above the transition temperature of the controlling medium to the blue phase; generally the operating temperature is in the range of about 0.1° to about 50°, preferably in the range of about 0.1° to about 40° above said temperature. It is highly preferred that the operating temperature is in the range from the transition temperature of the controlling medium to the blue phase up to the transition temperature of the controlling medium from the blue phase to the isotropic phase, which is the clearing point. The light controlling elements, however, may also be operated at temperatures at which the controlling medium is in the isotropic phase.

For the purposes of the present invention the term "characteristic temperature" is defined as follows:
  If the characteristic voltage as a function of temperature has a minimum, the temperature at this minimum is denoted as characteristic temperature.
  If the characteristic voltage as a function of temperature has no minimum and if the controlling medium has one or more blue phases, the transition temperature to the blue phase is denoted as characteristic temperature; in case there are more than one blue phase, the lowest transition temperature to a blue phase is denoted as characteristic temperature.
  If the characteristic voltage as a function of temperature has no minimum and if the controlling medium has no blue phase, the transition temperature to the isotropic phase is denoted as characteristic temperature.

In the context of the present invention the term "alkyl" means, as long as it is not defined in a different manner elsewhere in this description or in the claims, straight-chain and branched hydrocarbon (aliphatic) radicals with 1 to 15 carbon atoms. The hydrocarbon radicals may be unsubstituted or substituted with one or more substituents being independently selected from the group consisting of F, Cl, Br, I or CN.

The dielectrics may also comprise further additives known to the person skilled in the art and described in the literature. For example, 0 to 5% of pleochroic dyes, antioxidants or stabilizers can be added. C denotes a crystalline phase, S a smectic phase, $S_C$ a smectic C phase, N a nematic phase, I the isotropic phase and BP the blue phase.

$V_X$ denotes the voltage for X % transmission. Thus e.g. $V_{10}$ denotes the voltage for 10% transmission and $V_{100}$ denotes the voltage for 100% transmission (viewing angle perpendicular to the plate surface). $t_{on}$ (respectively $\tau_{on}$) denotes the switch-on time and $t_{off}$ (respectively $\tau_{off}$) the switch-off time at an operating voltage corresponding the value of $V_{100}$, respectively of $V_{max}$.

$\Delta n$ denotes the optical anisotropy. $\Delta\epsilon$ denotes the dielectric anisotropy ($\Delta\epsilon = \epsilon_\parallel - \epsilon_\perp$, where $\epsilon_\parallel$ denotes the dielectric constant parallel to the longitudinal molecular axes and $\epsilon_\perp$ denotes the dielectric constant perpendicular thereto). The electro-optical data are measured in a TN cell at the 1$^{st}$ minimum of transmission (i.e. at a (d·$\Delta n$) value of 0.5 μm) at 20° C., unless expressly stated otherwise. The optical data are measured at 20° C., unless expressly stated otherwise.

Optionally, the light modulation media according to the present invention can comprise further liquid crystal compounds in order to adjust the physical properties. Such compounds are known to the expert. Their concentration in the media according to the instant invention is preferably 0% to 30%, more preferably 0% to 20% and most preferably 5% to 15%.

Preferably the mesogenic media of the inventive systems have a range of the blue phase or, in case of the occurrence of more than one blue phase, a combined range of the blue phases, with a width of 9° or more, preferably of 10° or more, more preferably of 15° or more and most preferably of 20° or more.

In a preferred embodiment this phase range at least from 10° C. to 30° C., most preferably at least from 10° C. to 40° C. and most preferably at least from 0° C. to 50° C., wherein at least means, that preferably the phase extends to temperatures below the lower limit and at the same time, that it extends to temperatures above the upper limit.

In another preferred embodiment this phase range at least from 20° C. to 40° C., most preferably at least from 30° C. to 80° C. and most preferably at least from 30° C. to 90° C. This embodiment is particularly suited for displays with a strong back light, dissipating energy and thus heating the display. Also preferred are systems with a range from at least −20° C. to 50° C.

In the present application the term dielectrically positive compounds describes compounds with $\Delta\epsilon > 1.5$, dielectrically neutral compounds are compounds with $-1.5 \leq \Delta\epsilon \leq 1.5$ and dielectrically negative compounds are compounds with $\Delta\epsilon < -1.5$. The same holds for components. $\Delta\epsilon$ is determined at 1 kHz and 20° C. The dielectrical anisotropies of the compounds is determined from the results of a solution of 10% of the individual compounds in a nematic host mixture. The capacities of these test mixtures are determined both in a cell with homeotropic and with homogeneous alignment. The cell gap of both types of cells is approximately 20 μm. The voltage applied is a rectangular wave with a frequency of 1 kHz and a root mean square value typically of 0.5 V to 1.0 V, however, it is always selected to be below the capacitive threshold of the respective test mixture.

For dielectrically positive compounds the mixture ZLI-4792 and for dielectrically neutral, as well as for dielectrically negative compounds, the mixture ZLI-3086, both of Merck KGaA, Germany are used as host mixture, respectively. The dielectric permittivities of the compounds are determined from the change of the respective values of the host mixture upon addition of the compounds of interest and are extrapolated to a concentration of the compounds of interest of 100%.

Components having a nematic phase at the measurement temperature of 20° C. are measured as such, all others are treated like compounds.

The term threshold voltage refers in the instant application to the optical threshold and is given for 10% relative contrast ($V_{10}$) and the term saturation voltage refers to the optical saturation and is given for 90% relative contrast ($V_{90}$) both, if not explicitly stated otherwise. The capacitive threshold voltage ($V_0$, also called Freedericksz-threshold $V_{Fr}$) is only used if explicitly mentioned.

The ranges of parameters given in this application are all including the limiting values, unless explicitly stated otherwise.

Throughout this application, unless explicitly stated otherwise, all concentrations are given in mass percent and relate to the respective complete mixture, all temperatures are given in degrees centigrade (Celsius) and all differences of temperatures in degrees centigrade. All physical properties have been and are determined according to "Merck Liquid Crystals, Physical Properties of Liquid Crystals", Status November 1997, Merck KGaA, Germany and are given for a temperature of 20° C., unless explicitly stated otherwise. The optical anisotropy ($\Delta n$) is determined at a wavelength of 589.3 nm. The dielectric anisotropy ($\Delta \in$) is determined at a frequency of 1 kHz. The threshold voltages, as well as all other electro-optical properties have been determined with test cells prepared at Merck KGaA, Germany. The test cells for the determination of $\Delta \in$ had a cell gap of 22 µm. The electrode was a circular ITO electrode with an area of 1.13 cm² and a guard ring. The orientation layers were lecithin for homeotropic orientation ($\in_{\parallel}$) and polyimide AL-1054 from Japan Synthetic Rubber for homogenous orientation ($\in_{\perp}$). The capacities were determined with a frequency response analyser Solatron 1260 using a sine wave with a voltage of 0.3 or 0.1 $V_{rms}$. The light used in the electro-optical measurements was white light. The set up used was a commercially available equipment of Autronic Melchers, Karlsruhe, germany: DMS 301 reespectively DMS 730. The characteristic voltages have been determined under perpendicular observation. The threshold voltage ($V_{10}$), mid-grey voltage ($V_{50}$) and saturation voltage ($V_{90}$) have been determined for 10%, 50% and 90% relative contrast, respectively.

The mesogenic modulation material has been filled into an electro optical test cell prepared at the respective facility of Merck KGaA. The test cells had inter-digital electrodes on one substrate side. The electrode width was 10 µm, the distance between adjacent electrodes was 10 µm and the cell gap was also 10 µm. This test cell has been evaluated electro-optically between crossed polarisers.

At low temperatures, the filled cells showed the typical texture of a chiral nematic mixture, with an optical transmission between crossed polarisers without applied voltage. Upon heating, at a first temperature ($T_1$) the mixtures turned optically isotropic, being dark between the crossed polarisers. This indicated the transition from the chiral nematic phase to the blue phase at that temperature. Up to a second temperature ($T_2$) the cell showed an electro-optical effect under applied voltage, typically of some tens of volts, a certain voltage in that range leading to a maximum of the optical transmission. Typically at a higher temperature the voltage needed for a visible electro-optical effect increased strongly, indicating the transition from the blue phase to the isotropic phase at this second temperature ($T_2$).

The temperature range ($\Delta T(BP)$), where the mixture can be used electro-optically in the blue phase most beneficially has been identified as ranging from $T_1$ to $T_2$. This temperature range ($\Delta T(BP)$) is the temperature range given in the examples of this application. The electro-optical displays can also be operated at temperatures beyond this range, i.e. at temperatures above $T_2$, albeit only at significantly increased operation voltages.

At low temperatures the cell show the typical texture of a chiral nematic mixture, with an optical transmission between crossed polarisers without applied voltage. On heating, at a the temperature $T_1$ the mixture becomes optically isotropic, being dark between the crossed polarisers. This indicates the transition from the chiral nematic phase to the blue phase. Upon further hearting the cell showed a clear electro optical effect under applied voltage up to the temperature $T_2$.

The temperature range ($\Delta T(BP)$), where the mixture can be used electro-optically in the blue phase is $T_1$ to $T_2$, Besides the operation voltages also the response times, both for switching on ($\Delta_{on}$) and for switching off ($\Delta_{off}$), do significantly depend on the temperature. The response times decrease with increasing temperature above $T_1$ and the temperature at which both response times have fallen below 5 ms each is called ($T_3$). The temperature range over which the cells can be utilized satisfying both conditions, i.e. are having a reasonably low opreation voltage and each of the two response times being below 5 ms, is called usable flat range or short flat range and given as: $\Delta T(FR) = T_2 - T_3$.

The liquid crystal media according to the present invention can contain further additives and chiral dopants in usual concentrations. The total concentration of these further constituents is in the range of 0% to 10%, preferably 0.1% to 6%, based in the total mixture. The concentrations of the individual compounds used each are preferably in the range of 0.1 to 3%. The concentration of these and of similar additives is not taken into consideration for the values and ranges of the concentrations of the liquid crystal components and compounds of the liquid crystal media in this application.

The inventive liquid crystal media according to the present invention consist of several compounds, preferably of 3 to 30, more preferably of 5 to 20 and most preferably of 6 to 14 compounds. These compounds are mixed in conventional way. As a rule, the required amount of the compound used in the smaller amount is dissolved in the compound used in the greater amount. In case the temperature is above the clearing point of the compound used in the higher concentration, it is particularly easy to observe completion of the process of dissolution. It is, however, also possible to prepare the media by other conventional ways, e.g. using so called pre-mixtures, which can be e.g. homologous or eutectic mixtures of compounds or using so called multi-bottle-systems, the constituents of which are ready to use mixtures themselves.

The components B of the systems according to the present invention may beneficially comprise one or more additives, like e.g. tri-alkoxy-substituted phenyl compounds, tetraalkoxy-substituted phenyl compounds, penta-alkoxy-substituted phenyl compounds and compounds with bulky end groups.

By addition of suitable additives, the liquid crystal media according to the instant invention can be modified in such a way, that they are usable in all known types of liquid crystal displays, either using the liquid crystal media as such, like TN-, TN-AMD, ECB-, VAN-AMD and in particular in compo-site systems, like PDLD-, NCAP- and PN-LCDs and especially in HPDLCs.

The melting point T(C,N), the transition from the smectic (S) to the nematic (N) phase T(S,N), the clearing point T(N,I), the transition temperature from the cholesteric phase to the blue phase (T(Ch,BP) also called T(N*,BP)), the transition temperature from the blue phase to the isotropic phase (T(BP,I)) and all other transition temperatures of the liquid crystals are given in degrees centigrade.

In the compounds of the mesogenic host mixture, component B comprises one or more compounds which have one or more linking groups (e.g. $Z^{21}$ and/or $Z^{22}$ and/or $Z^{23}$ for the compounds of formula II) which is/are different from a single bond. Preferably these linking groups are selected from —CO—O—, —O—CO—, —CF$_2$—O— and —O—CF$_2$—.

In a preferred embodiment of the present invention the polymer precursor comprises reactive compounds, preferably of formula I, preferably its component A comprises, preferably it consists of, compounds of formula I which have one or more linking group or groups $Z^{11}$ to $Z^{14}$, which are different from a single bond, which are identical to the linking group or linking groups, which are different from a single bond, which are present in the majority (either by mass % or, preferably, by mole %) of the compounds of the mesogenic host mixture.

In the present application and especially in the following examples, the structures of the liquid crystal compounds are represented by abbreviations also called acronyms. The transformation of the abbreviations into the corresponding structures is straight forward according to the following two tables A and B. All groups $C_nH_{2n+1}$ and $C_mH_{2m+1}$ are straight chain alkyl groups with n respectively m D-atoms. The interpretation of table B is self evident. Table A does only list the abbreviations for the cores of the structures. The individual compounds are denoted by the abbreviation of the core followed by a hyphen and a code specifying the substituents $R^1$, $R^2$, $L^1$ and $L^2$ follows:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nN.F.F | $C_nH_{2n+1}$ | CN | F | F |
| nF | $C_nH_{2n+1}$ | F | H | H |
| nF.F | $C_nH_{2n+1}$ | F | H | F |
| nF.F.F | $C_nH_{2n+1}$ | F | F | F |
| nOF | $OC_nH_{2n+1}$ | F | H | H |
| nCl | $C_nH_{2n+1}$ | Cl | H | H |
| nCl.F | $C_nH_{2n+1}$ | Cl | H | F |
| nCl.F.F | $C_nH_{2n+1}$ | Cl | F | F |
| nCF$_3$ | $C_nH_{2n+1}$ | CF$_3$ | H | H |
| nOCF$_3$ | $C_nH_{2n+1}$ | OCF$_3$ | H | H |
| nOCF$_3$.F | $C_nH_{2n+1}$ | OCF$_3$ | H | F |
| nOCF$_3$.F.F | $C_nH_{2n+1}$ | OCF$_3$ | F | F |
| nOCF$_2$ | $C_nH_{2n+1}$ | OCHF$_2$ | H | H |
| nOCF$_2$.F | $C_nH_{2n+1}$ | OCHF$_2$ | H | F |

-continued

| Code for $R^1$, $R^2$, $L^1$, $L^2$ | $R^1$ | $R^2$ | $L^1$ | $L^2$ |
|---|---|---|---|---|
| nOCF$_2$.F.F | $C_nH_{2n+1}$ | OCHF$_2$ | F | F |
| nS | $C_nH_{2n+1}$ | NCS | H | H |
| nS.F | $C_nH_{2n+1}$ | NCS | H | F |
| nS.F.F | $C_nH_{2n+1}$ | NCS | F | F |
| rVsN | $C_rH_{2r+1}$—CH=CH—$C_sH_{2s}$— | CN | H | H |
| rEsN | $C_rH_{2r+1}$—O—$C_sH_{2s}$— | CN | H | H |
| nAm | $C_nH_{2n+1}$ | COOC$_m$H$_{2m+1}$ | H | H |
| nF.Cl | $C_nH_{2n+1}$ | Cl | H | F |

TABLE A

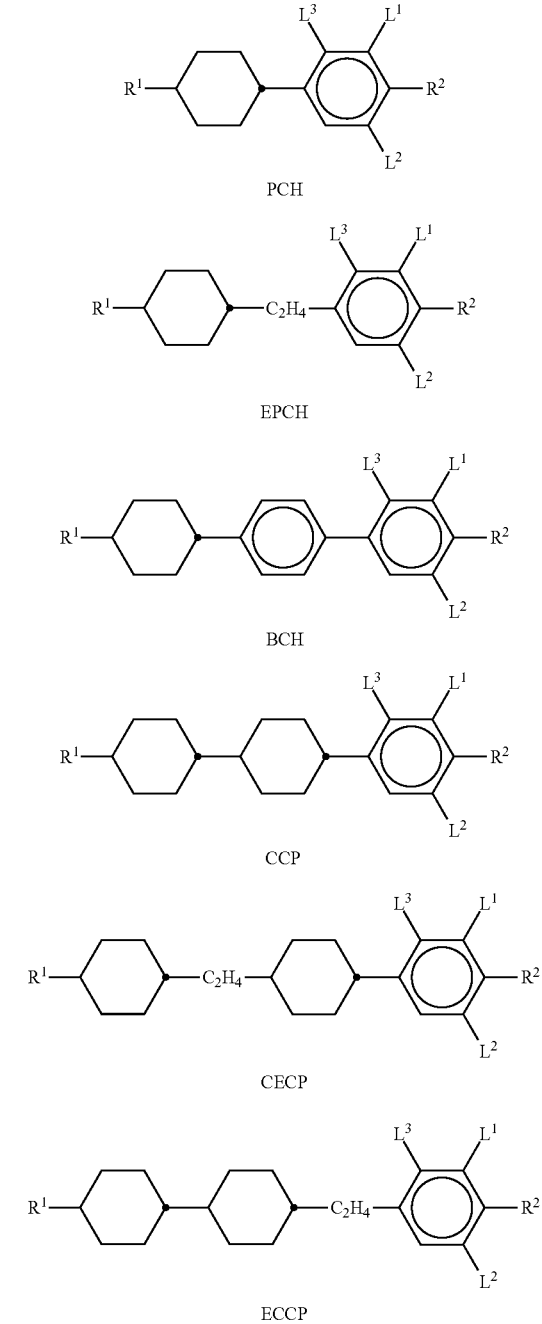

PCH

EPCH

BCH

CCP

CECP

ECCP

TABLE A-continued
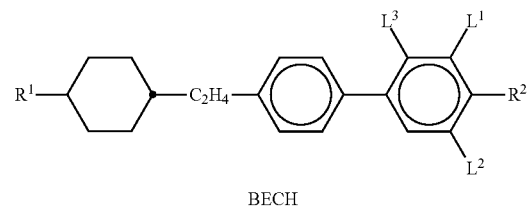
BECH
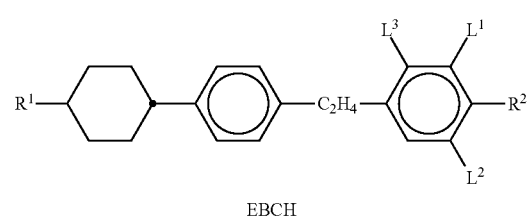
EBCH
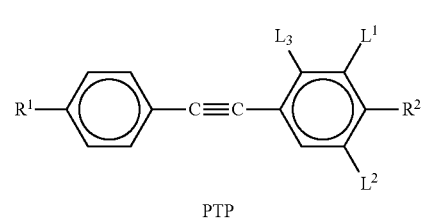
PTP
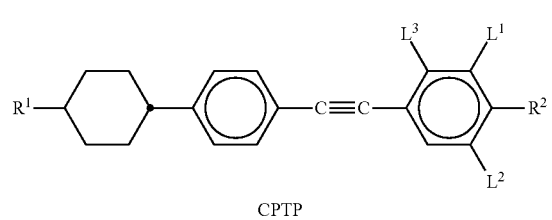
CPTP
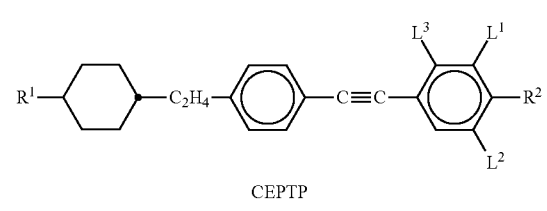
CEPTP
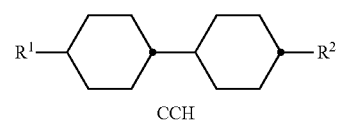
CCH
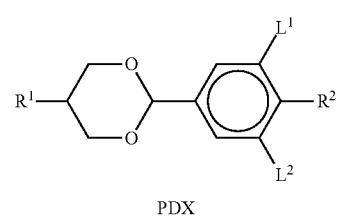
PDX
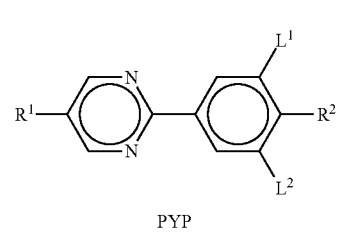
PYP
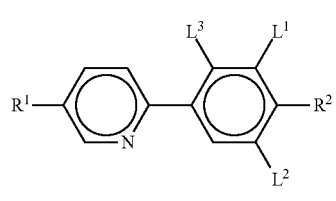
PYRP
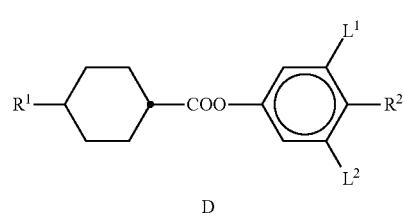
D
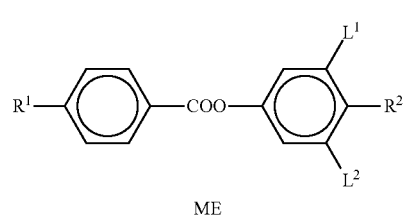
ME
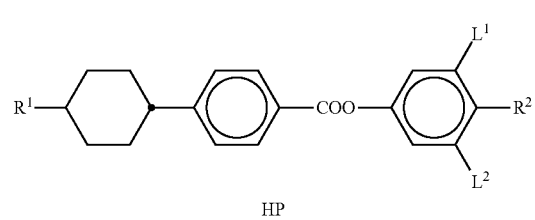
HP
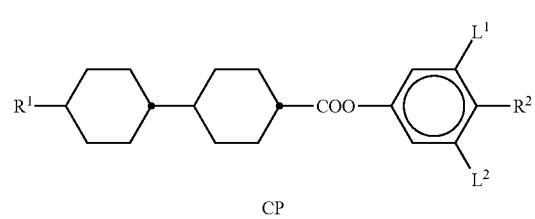
CP
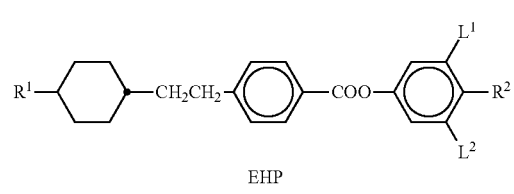
EHP TABLE A-continued
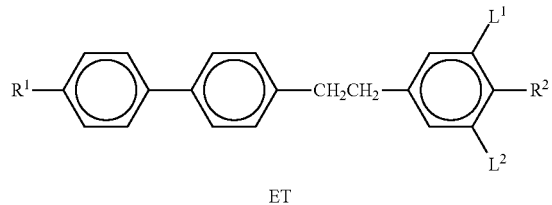
ET
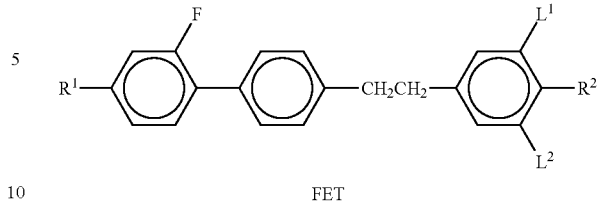
FET
TABLE B
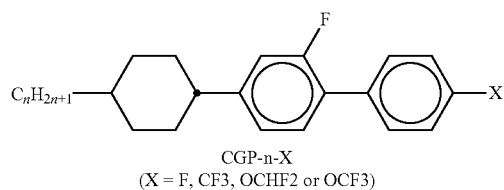
CGP-n-X
(X = F, CF3, OCHF2 or OCF3)
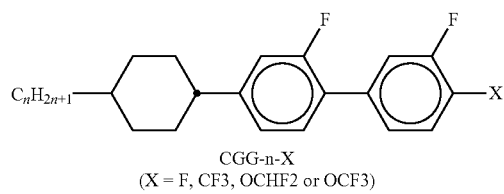
CGG-n-X
(X = F, CF3, OCHF2 or OCF3)
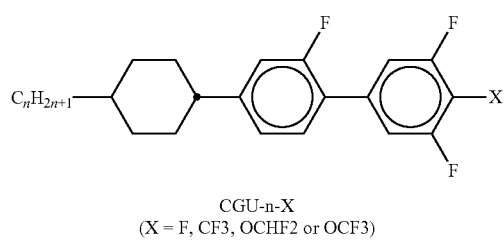
CGU-n-X
(X = F, CF3, OCHF2 or OCF3)
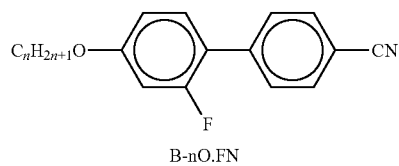
B-nO.FN
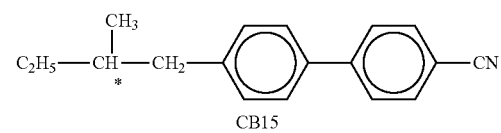
CB15
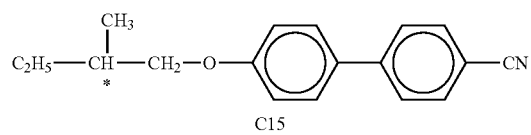
C15
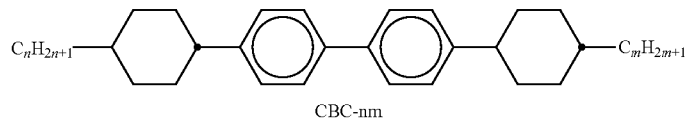
CBC-nm TABLE B-continued
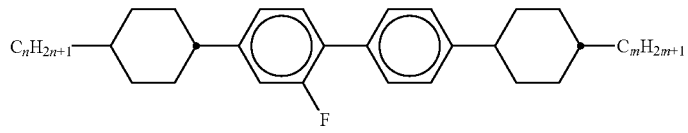
CBC-nmF
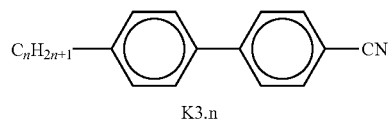
K3.n
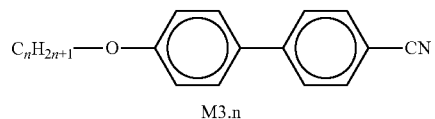
M3.n
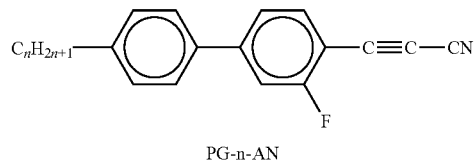
PG-n-AN
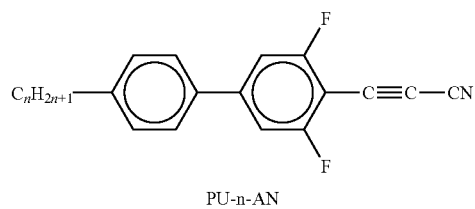
PU-n-AN
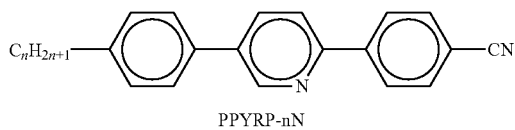
PPYRP-nN
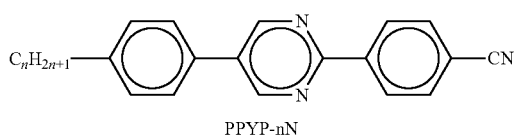
PPYP-nN
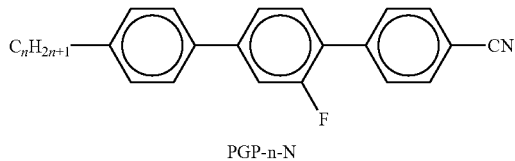
PGP-n-N
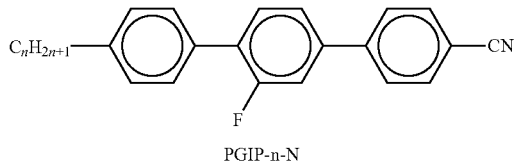
PGIP-n-N TABLE B-continued
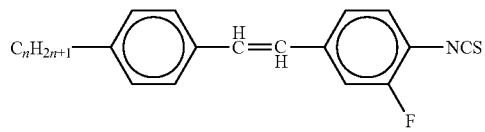
PVG-n-S
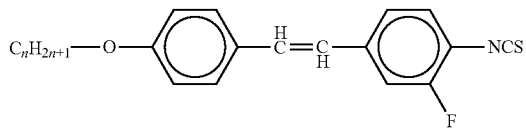
PVG-nO-S
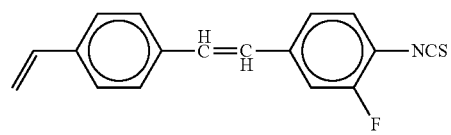
PVG-V-S
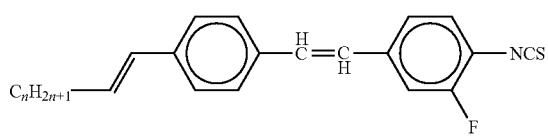
PVG-nV-S
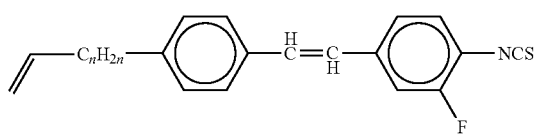
PVG-Vn-S
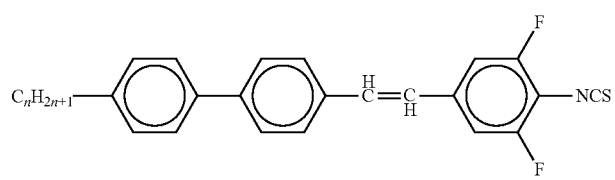
PPVU-n-S
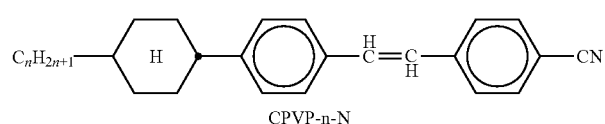
CPVP-n-N
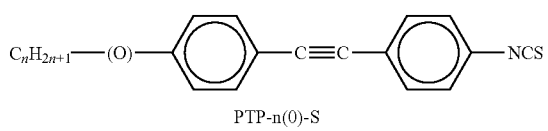
PTP-n(0)-S
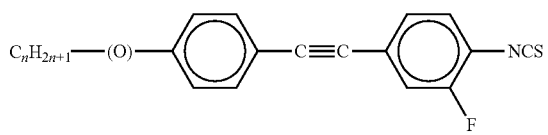
PTG-n(0)-S TABLE B-continued
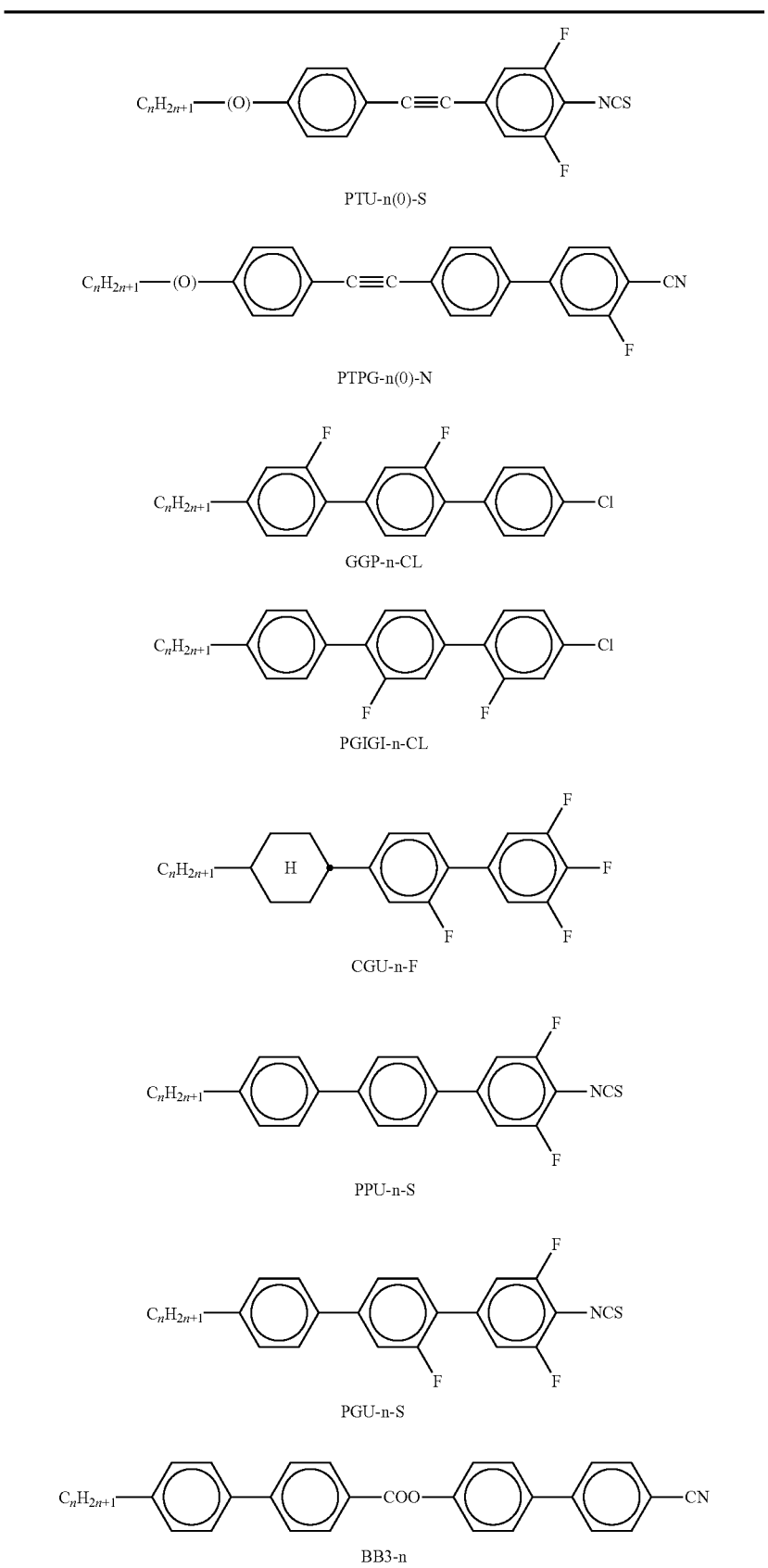

TABLE B-continued
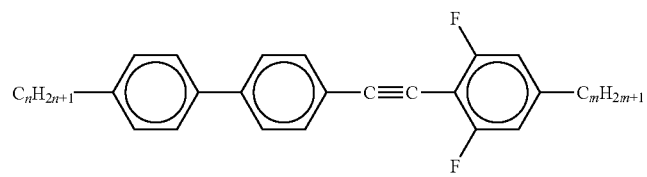
PPTUI-n-m
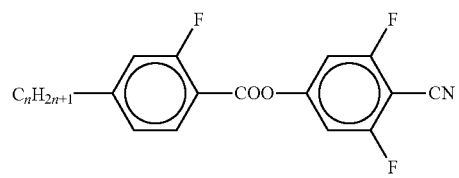
GZU-n-N
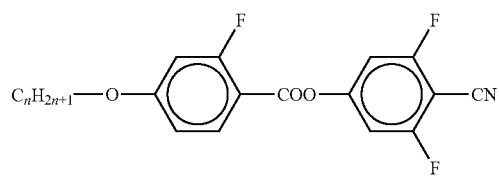
GZU-nO-N
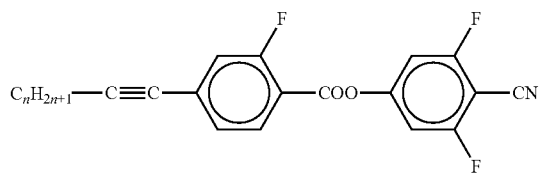
GZU-nA-N
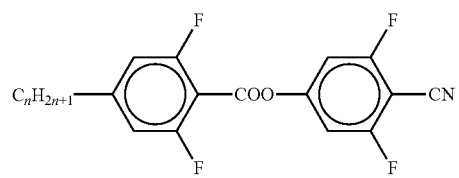
UZU-n-N
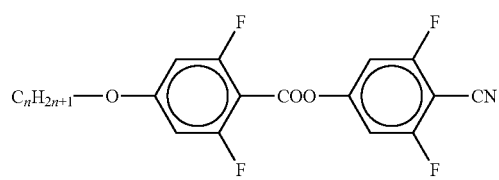
UZU-nO-N
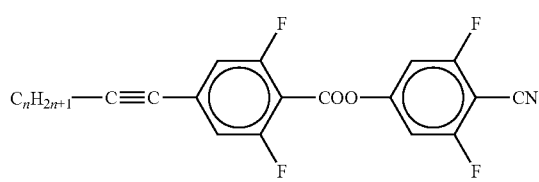
UZU-nA-N TABLE B-continued
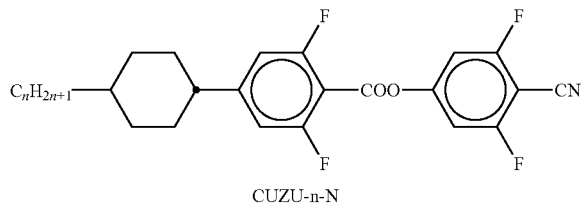
CUZU-n-N
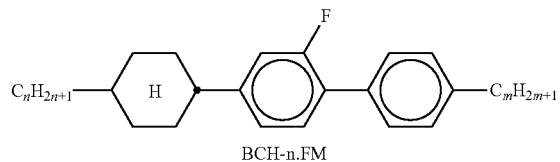
BCH-n.FM
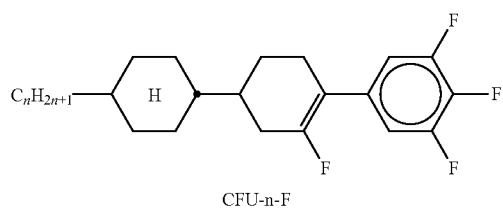
CFU-n-F
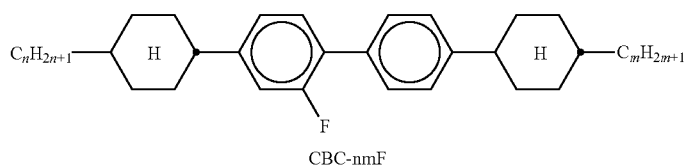
CBC-nmF
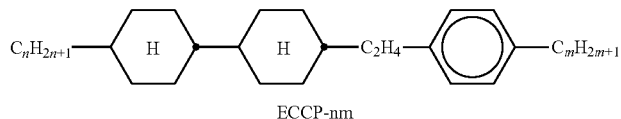
ECCP-nm
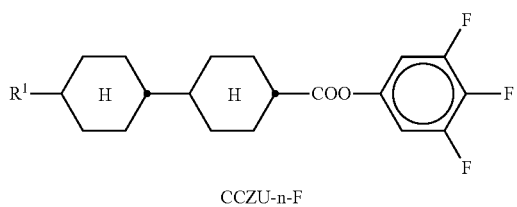
CCZU-n-F
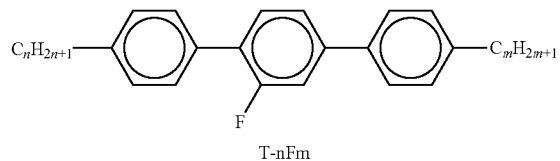
T-nFm
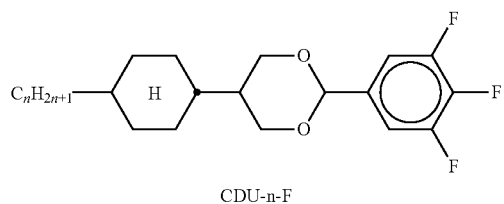
CDU-n-F TABLE B-continued
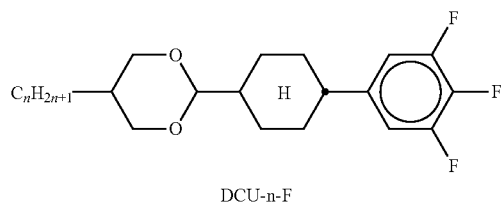
DCU-n-F
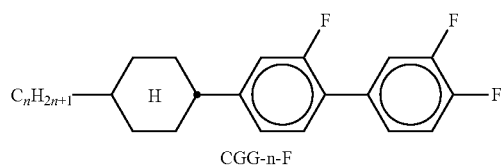
CGG-n-F
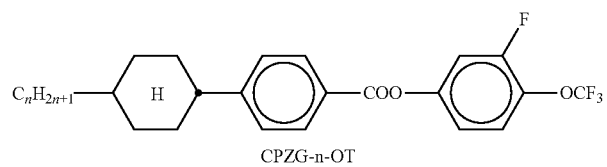
CPZG-n-OT
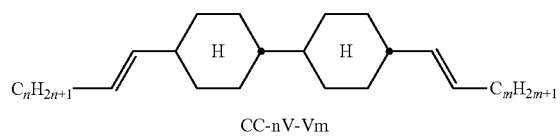
CC-nV-Vm
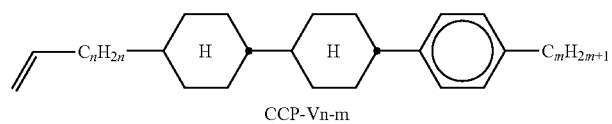
CCP-Vn-m
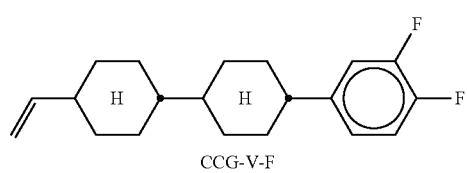
CCG-V-F
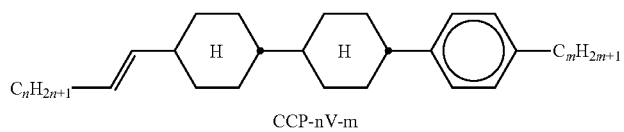
CCP-nV-m
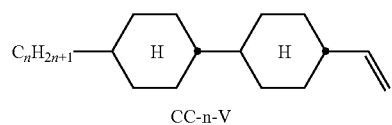
CC-n-V
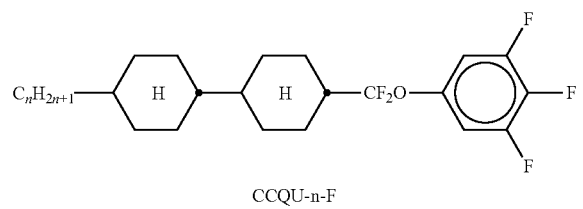
CCQU-n-F TABLE B-continued
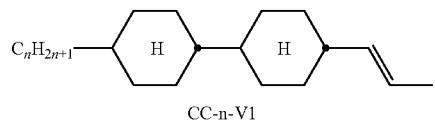
CC-n-V1
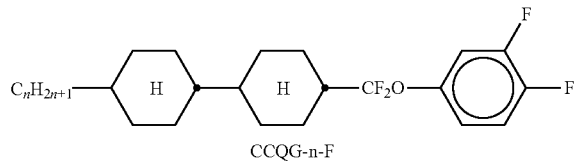
CCQG-n-F
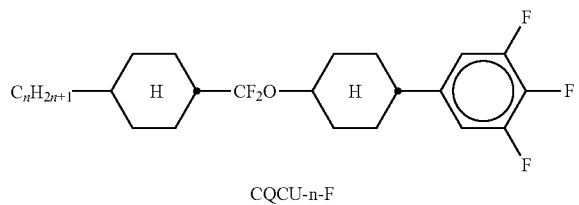
CQCU-n-F
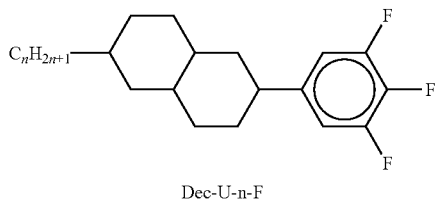
Dec-U-n-F
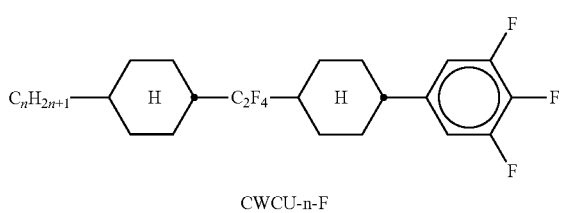
CWCU-n-F
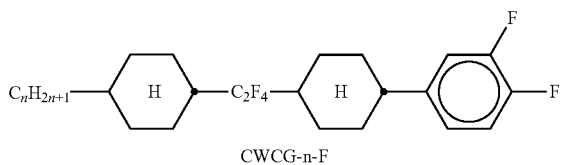
CWCG-n-F
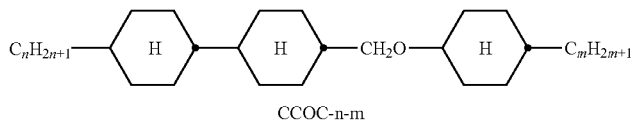
CCOC-n-m
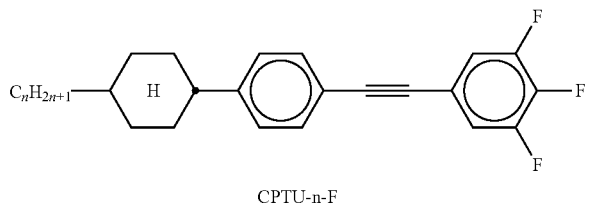
CPTU-n-F TABLE B-continued
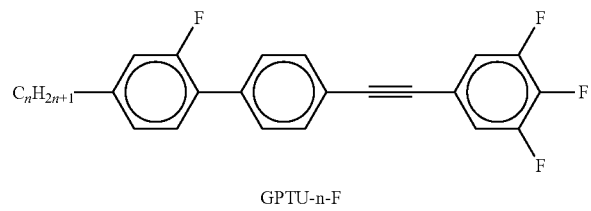
GPTU-n-F
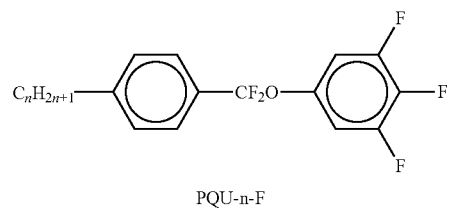
PQU-n-F
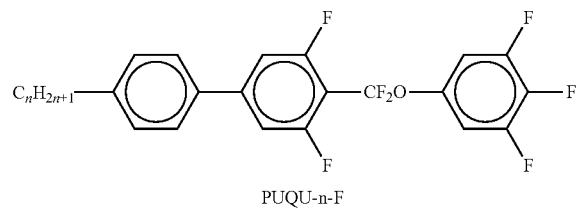
PUQU-n-F
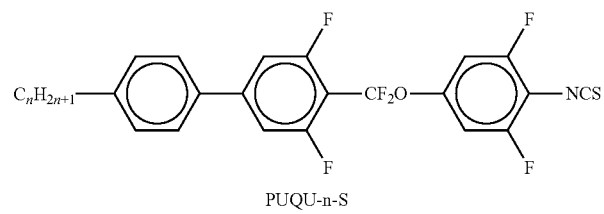
PUQU-n-S
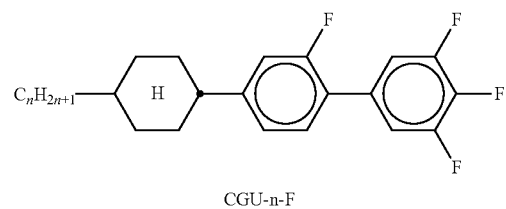
CGU-n-F
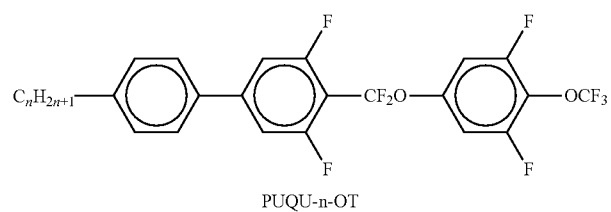
PUQU-n-OT
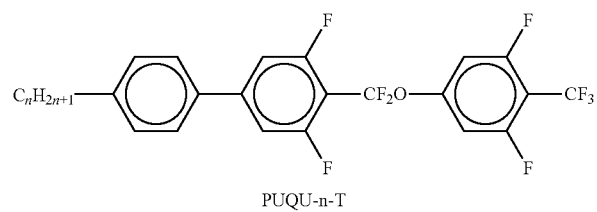
PUQU-n-T TABLE B-continued
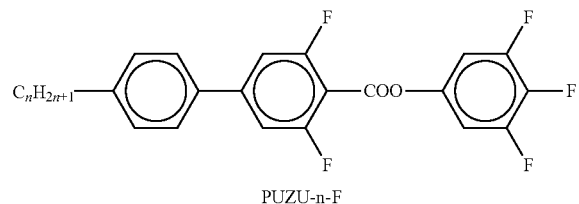
PUZU-n-F
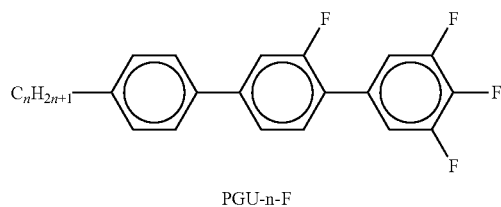
PGU-n-F
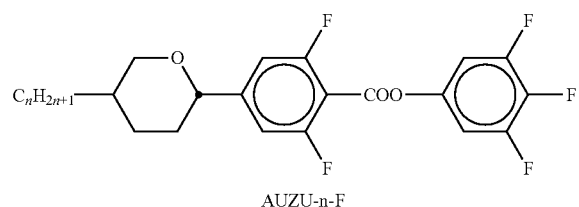
AUZU-n-F
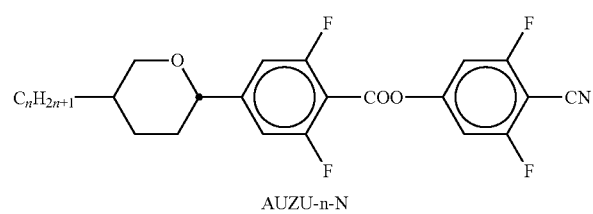
AUZU-n-N
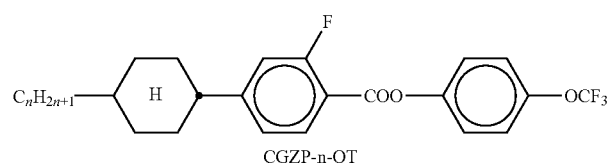
CGZP-n-OT
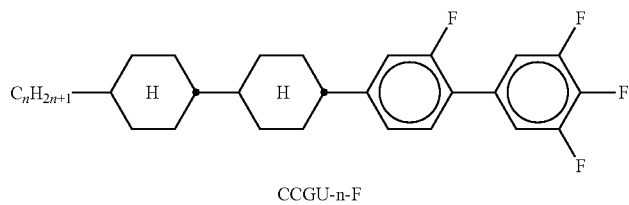
CCGU-n-F
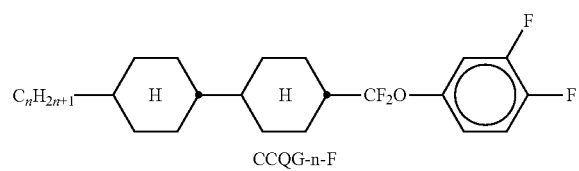
CCQG-n-F
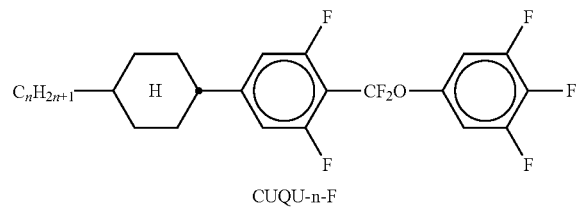
CUQU-n-F TABLE B-continued
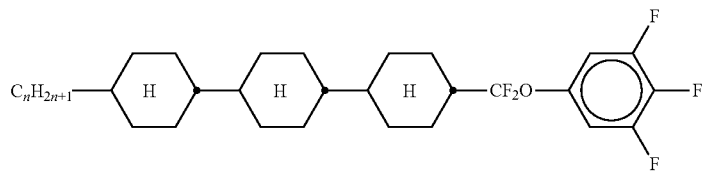
CCCQU-n-F
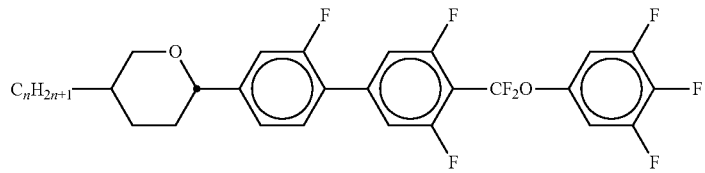
AGUQU-n-F
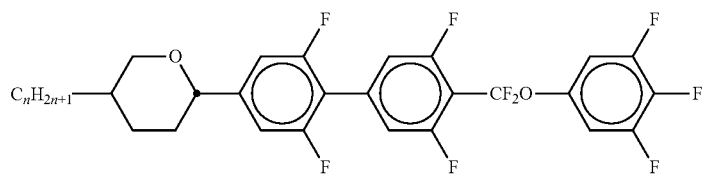
AUUQU-n-F
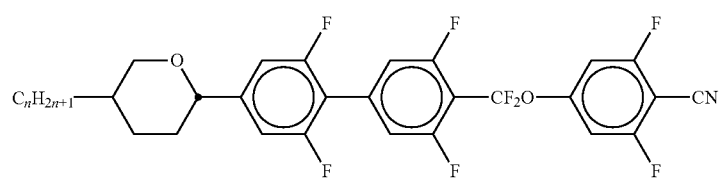
AUUQU-n-N
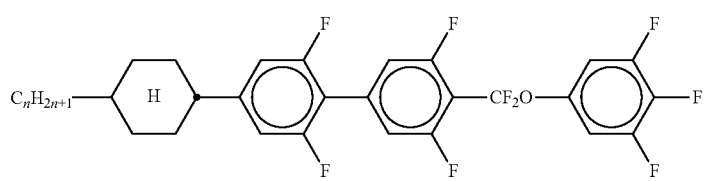
CUUQU-n-F
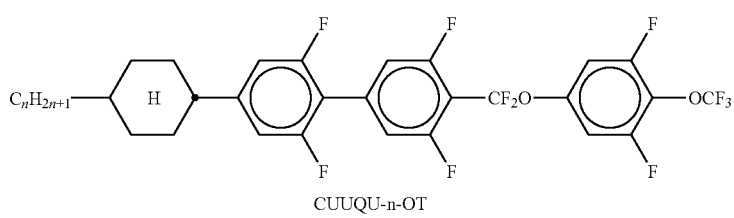
CUUQU-n-OT
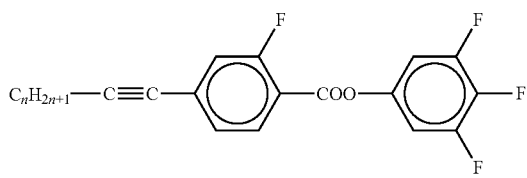
GZU-nA-N TABLE B-continued
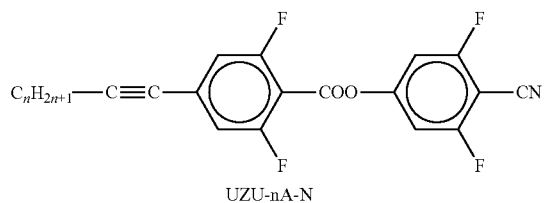
UZU-nA-N
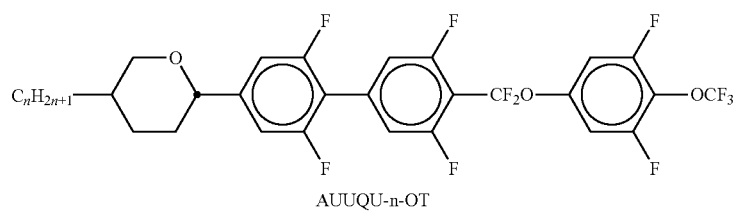
AUUQU-n-OT
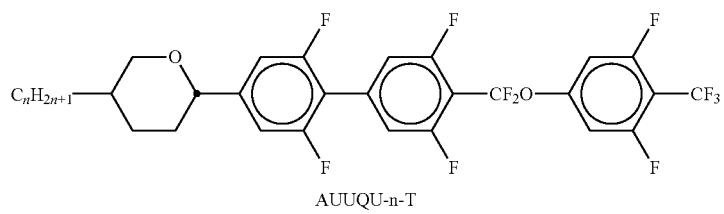
AUUQU-n-T
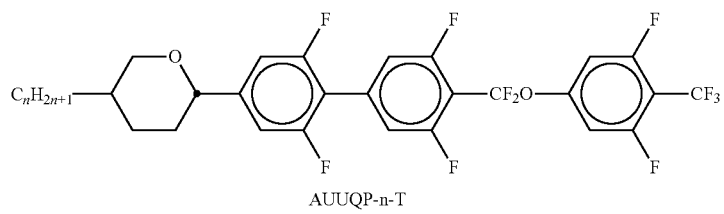
AUUQP-n-T
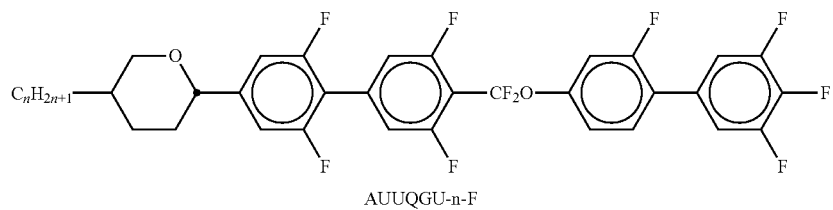
AUUQGU-n-F
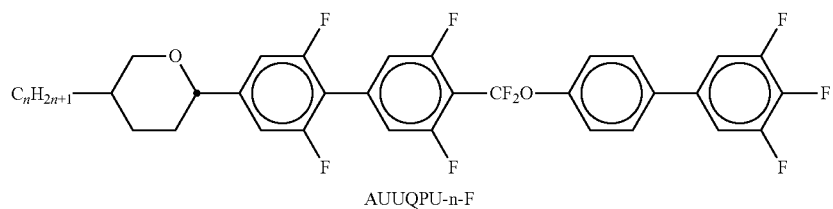
AUUQPU-n-F
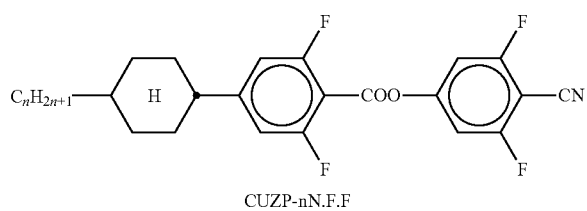
CUZP-nN.F.F

TABLE B-continued

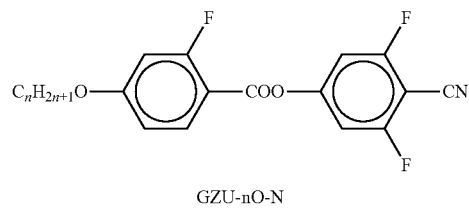

GZU-nO-N

Particular preference is given to liquid-crystalline mixtures which, besides the compounds of the formula I, comprise at least one, two, three or four compounds from Table B.

TABLE C

Table C shows possible dopants according to component D which are generally added to the mixtures alone or in combination two, three or more) according to the invention.

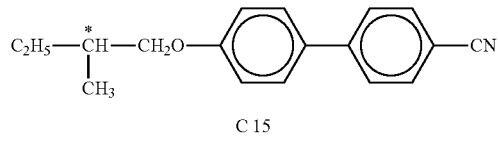

C 15

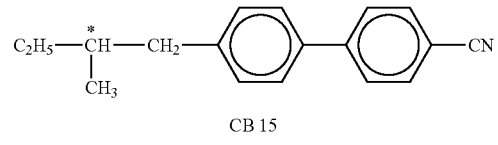

CB 15

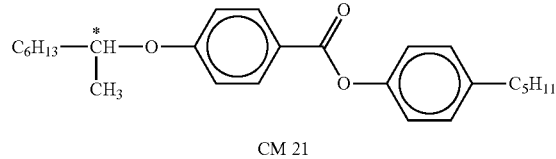

CM 21

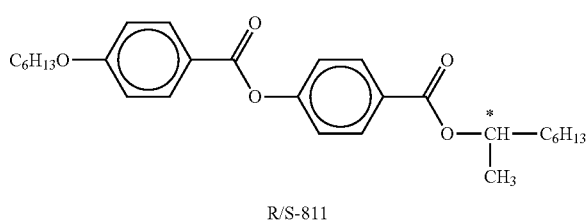

R/S-811

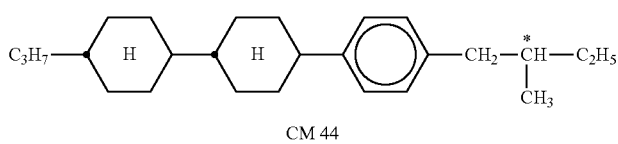

CM 44

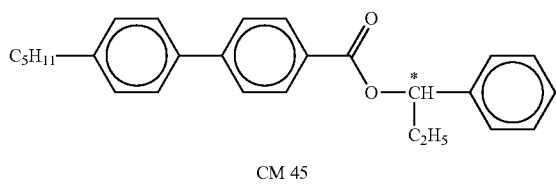

CM 45

TABLE C-continued
Table C shows possible dopants according to component D which are generally added to the mixtures alone or in combination two, three or more) according to the invention.
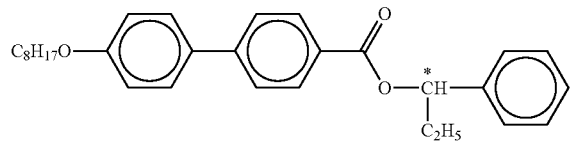
CM 47
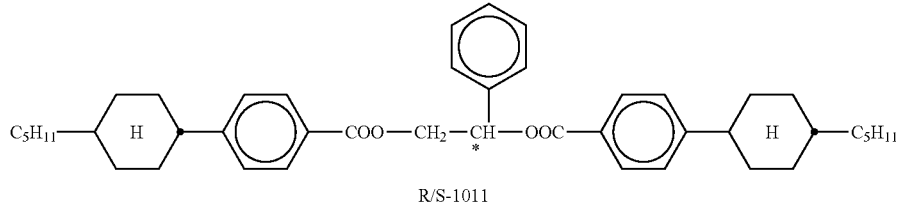
R/S-1011
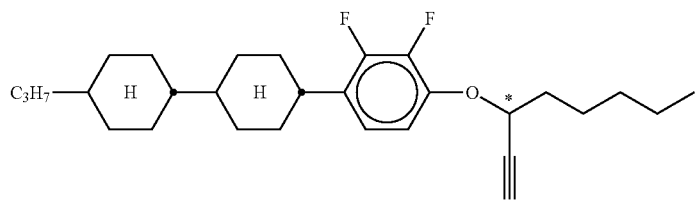
R/S-3011
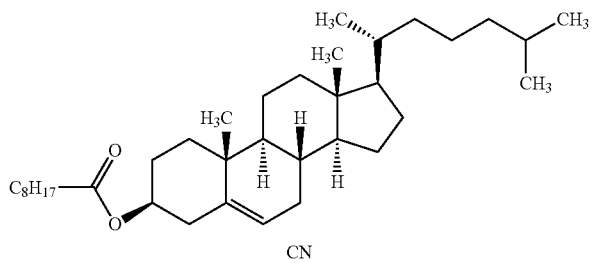
CN
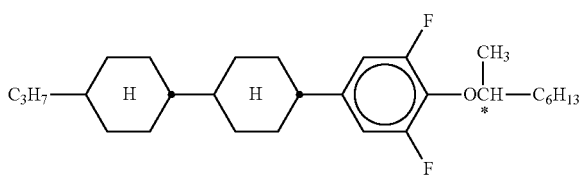
R/S-2011
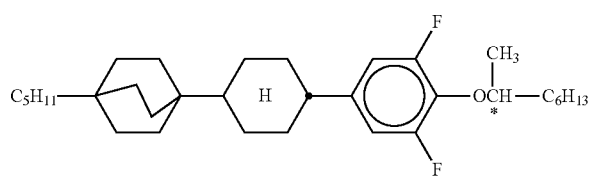
R/S-4011

TABLE C-continued

Table C shows possible dopants according to component D which are generally added to the mixtures alone or in combination two, three or more) according to the invention.

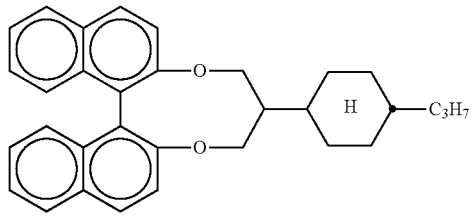

R/S-5011

The liquid crystal media according to the instant invention do contain preferably

- four or more compounds selected from the group of compounds of tables A and B and/or
- five or more compounds selected from the group of compounds of table B and/or
- two or more compounds selected from the group of compounds of table A.

EXAMPLES

The examples given in the following are illustrating the present invention without limiting it in any way.

However, the physical data especially of the compositions both of the polymer precursors and of the mesogenic host mixtures illustrate to the expert which properties can be achieved in which ranges. The combination of the various properties which can be preferably achieved is thus well defined.

In the following set of examples (examples 1-1 to 1-6 and 2-1 to 2-7) the influence of monomers and of cross-linkers is investigated for mixtures containing a combination of monoacrylated reactive mesogen (MRM) and diacrylated reactive mesogen (DRM).

Examples 1-1 to 1-7 and Comparative Example 1

In this first set of examples (examples 1-1 to 1-7) the influence of the mono-reactive monomers is investigated.

A small amount of photoinitiator 2,2-dimethoxy-1,2-diphenyl-ethanone (commercially known as Irgacure-651, here also short IRG-651) is added to the mixture. A chiral dopant with a high value of the helical twisting power (HTP), R-5011, obtainable from Merck KGaA, is added to the mixture in concentrations from 2.8% to 3.8%. The HTP of the chiral dopant R-5011 is measured as 130 $\mu m^{-1}$ in the polar host mixture A-0 with the composition given in the table below,

TABLE 1

Composition and Properties of Host Mixture A-0

| Compound Abbreviation | Concentration/ mass-% | Physical Properties |
|---|---|---|
| GZU-3A-N | 15.0 | T(N, I) = 56.5° C. |
| GZU-4A-N | 15.0 | |
| GZU-4O-N | 15.0 | Δn (20° C., 589 nm) = 0.164 |
| UZU-3A-N | 8.0 | |
| CUZU-2-N | 9.0 | |

TABLE 1-continued

Composition and Properties of Host Mixture A-0

| Compound Abbreviation | Concentration/ mass-% | Physical Properties |
|---|---|---|
| CUZU-3-N | 9.0 | |
| CUZU-4-N | 9.0 | |
| HP-3N.F | 6.0 | |
| HP-4N.F | 6.0 | |
| HP-5N.F | 8.0 | |
| Σ | 100.0 | |

The types of cells used are typically either 10 μm thick cells without any alignment layers or 50 μm thick SSCT cells with planar alignment as thicker samples are occasionally required to allow for the optical observation of the Blue Phases. The cells have a size of approximately 2.0 cm×2.5 cm. The electrode area is about 1.0 cm×1.0 cm. They are filled by capillary action in an oven at a temperature of typically 100° C. Before polymerisation, the mixtures are characterised by polarising microscopy and their transition temperatures are measured on heating at 1° C./min. The experimental set-up consists of an Olympus BX51 polarising microscope equipped with a Linkam temperature programmer and hot-stage.

Polymerisation experiments are carried out using an EFOS UV lamp at 1.5 mW/cm² supplied with a broadband filter (320 nm to 500 nm). Initially, the sample is maintained at a temperature in the Blue Phase regime. After each increment of 15 s of UV irradiation, the texture of the cell is checked under polarising microscope to assess any changes. If a phase transition has occurred, the temperature for the next step of UV irradiation is changed accordingly. Total exposure times are typically 120 s at which stage, the final texture is stabilised.

As host mixture the mixture A-0 described above is used.

The compounds of formula IA are investigated in mixtures with the composition (in weight-%) given in the following table, table 5.

TABLE 2

Composition of the mixtures investigated in examples 1-1 to 1-6

| Compound/Mixture Abbreviation | Concentration/ mass-% |
|---|---|
| Respective comp. of formula IA | 7.0 |
| Comp. of formula IB-6 | 5.0 |
| R-5011 | 2.8 |

TABLE 2-continued

Composition of the mixtures investigated in examples 1-1 to 1-6

| Compound/Mixture Abbreviation | Concentration/ mass-% |
|---|---|
| Irgacure-651 | 0.6 |
| A-0 | 84.6 |
| Σ | 100.0 |

The phase behaviour of the systems before and after polymerisation is given in the following table, table 3.

TABLE 3

Phase behaviour of examples 1-1o 1-6 and of comparative example 1

| Expl. # | Compound of formula | Phases before curing | BP after curing |
|---|---|---|---|
| C.E. 1 | none | N* 47.1 BPI 47.6 BPII 51.4 I | not applicable |
| 1-1 | IA-1 | N* 49.9 BPI 51.1 I | −20° C. to 47° C. |
| 1-2 | IA-2 | N* 30.9 BPI 32.5 BPIII § | −20° C. to 35° C. |
| 1-3 | IA-3 | N* 30.3 BPI 31.7 BPIII 33.5 I | −20° C. to 40° C. |
| 1-4 | IA-4 | N* 42.6 BP § | −20° C. to 40° C. §§ |
| 1-5 | IA-5 | N* 47.8 BPI 49.5 BPIII § | −20° C. to 37° C. |
| 1-6 | IA-6 | N* 47.3 BPI 48.5 BPII 49.1 BPIII 51.5 Iso | −20° C. to 46° C. |
| 1-7 | IA-7 | n.d. | −20° C. to 46.5° C. |

Remarks: n.d. not determined,
§ no transition to isotropic phase observed and
§§ small areas of cholesteric (N*) present in the cells besides the Blue Phase (BP).

The best results obviously are obtained for examples 1-1, 1-6 and 1-7.

Examples 2-1 to 2-7

In this second set of examples (examples 2-1 to 2-7) the influence of the direactive monomers, the cross-linkers is investigated.

Here again the host mixture A-0 is used.

The compounds of formula IB are investigated in mixtures with the composition (in weight-%) given in the following table, table 4.

TABLE 4

Composition of the mixtures investigated in examples 2-1 to 2-7

| Compound/Mixture Abbreviation | Concentration/ mass-% |
|---|---|
| Comp. of formula IA-1 | 7.0 |
| Respective comp. of formula IB | 5.0 |
| R-5011 | 3.8 |
| Irgacure-651 | 0.6 |
| A-0 | 84.6 |
| Σ | 100.0 |

The phase behaviour of the systems before and after polymerisation is investigated as described under example 1 and the results are given in the following table, table 5.

TABLE 5

Phase behaviour of examples 2-1o 2-7

| Expl. # | Compound of formula | Phases before curing | BP after curing |
|---|---|---|---|
| 2-1 | IB-1 | N* 48.4 BPI 49.5 BPIII 50.9 I | −20° C. to +37° C. §§ |
| 2-2 | IB-2 | N* 41 BPI 41.5 BPIII 42 I | −20° C. to +40° C. $ |
| 2-3 | IB-3 | N* 48.3 BPI 49 Iso | −20° C. to +42° C. |
| 2-4 | IB-4 | N* 40.5 BPI 41.8 BPIII 42.5 I | −20° C. to +39° C. |
| 2-5 | IB-5 | N* 37.9 BPI 38.3 BPIII 38.4 I | −20° C. to +38° C. §§ |
| 2-6 | IB-6 | N* 43 BPI 45 I | −20° C. to +36° C. |
| 2-7 | IB-7 | N* 47 BPI 48 BPIII 50 I | 32° C. to 44° C. |

Remarks:
§ dark BP, probably BPIII and
§§ small areas of cholesteric (N*) present in the cells besides the Blue Phase (BP).

The best results obviously are obtained for examples 2-2, 2-3 and 2-6.

Comparative Example 2

A combination of a 2-ethylhexylacrylate (abbreviated as EHA), a non-mesogenic mono-reactive monomer and the compound of formula IB-6 were added to highly polar host mixture A-0 in the concentration given in the following table, table 6.

TABLE 6

Composition of the mixtures investigated in example 1

| Compound/Mixture Abbreviation | Concentration/ mass-% |
|---|---|
| EHA | 2.5 |
| Comp. of formula IB-6 | 5.0 |
| R-5011 | 2.8 |
| Irgacure-651 | 0.4 |
| A-0 | 89.3 |
| Σ | 100.0 |

This precursor is investigated as described under example 1. Phase separation between the non-mesogenic monomer EHA and the LC host occurs in the host mixture filled in the cell with a thickness of 10 μm and without alignment layer after 2 mins polymerisation by exposure to 1.5 mW/cm² UV light leading to the darker domains under the microscope, being polymer-rich regions and to nucleation of dendritic chiral nematic defects.

Examples 3.1 to 3.4 and Comparative Example 3

To host mixture A-0 the compound of formula IA-1, as mono-reactive mesogenic compound, and the compound of formula IB-6, as di-reactive mesogenic compound are added in various concentrations, together with 2.8% of the chiral dopant R-5011 and a small concentration (typically 0.6%) of the photo-intiator Irgacure-651 (short IRG-651). The compositions are given in the following table, table 7. The ratio of the concentration of mono-reactive mesogenic compound to that of the di-reactive mesogenic compound is kept constant at 1.4, whereas the total concentration of the reactive mesogens is varied in steps of 3% from 6% to 18%.

TABLE 7

Composition and results of examples 3.1 to 3.4 and of comparative example 3

| Example No. | C.E. 3 | 3.1 | 3.2 | 3.3a | 3.3b | 3.4 |
|---|---|---|---|---|---|---|
| Composition | | | | | | |
| c(R-5011)/% | | | | 2.8 | | |
| c(IRG-651)/% | | 0.6 | | | 1.06 | 0.6 |
| c(IA-1)/% | 3.5 | 5.25 | 7.0 | 8.75 | | 10.5 |
| c(IB-6)/% | 2.5 | 3.75 | 5.0 | 6.25 | | 7.5 |
| c(IA-1) + c(IB-6)/% | 6.0 | 9.0 | 12.0 | 15.0 | | 18.0 |
| Characteristic Temperatures | | | | | | |
| $T_2/°C$ | none | 38.0 | 39.0 | 34.0 | 33.0 | 31.0 |
| $T_3/°C$ | none | 38.0 | 30.0 | 25.0 | 25.0 | 25 |
| $T_1/°C$ | none | 38.0 | −1.0 | −3.5 | −1.0 | 1.0 |
| $\Delta T(BP)/°$ | none | 0.0 | 40.0 | 37.5 | 34 | 30.0 |
| $\Delta T(FR)/°$ | none | 0.0 | 9.0 | 9.0 | 8.0 | 6.0 |
| Characteristic Voltages | | | | | | |
| $T_{op}/°C$ | none | 38 | 10.0 | 10.0 | 10.0 | 10.0 |
| $V_{10, min}/V$ | none | 17 | 17.0 | n.d. | 20.0 | 31.0 |
| $V_{90, min}/V$ | none | 34 | 36.0 | n.d. | 47.0 | 64.0 |
| $V_{100, min}/V$ | none | 38 | 41.0 | 52.0 | 55.0 | 74.0 |

The resulting mixtures are filled into test cells and cured by illumination with UV and investigated. In this example and in the following examples test cells with an approximate size of 1.0 cm×1.0 cm are used. They have interdigital electrodes in a striped (comb-shaped) pattern on the inside of one substrate. The cells are filled on a hot plate having a temperature of about 80° C. to 100° C., while laying in a horizontal position. The characteristic temperatures and the minimum values of the characteristic voltages are determined. The results are also summarised in the preceeding table, table 8.

Obviously the total concentration of the polymer precursor of 6% used in comparative example 3 is too small to stabilise a blue phase, whereas that of 9% used in the example 3.1 is just sufficient for this purpose under the applied conditions.

The temperature dependence of the characteristic voltages of the cell of example 3.2 is given in table 8, below.

TABLE 8

Temperature dependence of characteristic voltages of example 3.2

| T/° C. | $V_{10}$/V | $V_{90}$/V |
|---|---|---|
| −10.0 | 34.0 | 78.0 |
| −5.1 | 22.0 | 48.0 |
| −0.3 | 18.0 | 38.0 |
| 4.9 | 17.0 | 36.0 |
| 9.6 | 17.0 | 36.0 |
| 15.0 | 17.0 | 37.0 |
| 20.0 | 19.0 | 39.0 |
| 25.0 | 21.0 | 41.0 |
| 30.1 | 22.0 | 44.0 |
| 34.9 | 25.0 | 47.0 |
| 39.8 | 28.0 | 54.0 |
| 40.1 | 29.0 | 55.0 |
| 45.1 | 44.0 | 82.0 |
| 50.1 | 61.0 | 116.0 |

The temperature range, over which the response times $\tau_{on}$ and $\tau_{off}$ both are below 5 ms and at the same time the characterisic voltage are still sufficiently low, for this example (3.2) extends from 30.1° C. to 40.1° C.

Example 4

Similar to example 3, 12% of the reactive mesogens and 0.6% of the photoinitiator Irgacure-651 are added together with the chiral dopant R-5011 to host mixture A-0. Now, however 4.0%, of R-5011 are used, as summarised in the following table, table 10. The resulting mixture is filled into test a cell and cured by illumination with UV and investigated. The characteristic temperatures and the minimum values of the characteristic voltages are determined. The results are also summarised in the following table, table 9. The data for examples 3.2 to 3.4 are included in this table for comparison.

TABLE 9

Composition and results of examples 4 and 5

| Example No. | 3.2 | 3.3a | 3.4 | 4 | 5 |
|---|---|---|---|---|---|
| Composition | | | | | |
| c(IRG-651)/% | | | 0.6 | | |
| c(R-5011)/% | | 2.8 | | 4.0 | 2.7 |
| c(IA-1)/% | 7.0 | 8.75 | 10.5 | 7.0 | 6.8 |
| c(IB-6)/% | 5.0 | 6.25 | 7.5 | 5.0 | 4.85 |
| [c(IA-1) + c(IB-6))/% | 12.0 | 15.0 | 18.0 | 12.0 | 11.65 |
| c(TRI)/% | | none | | | 3.0 |
| Characteristic Temperatures | | | | | |
| $T_2/°C$ | 39.0 | 34.0 | 31.0 | 30.0 | 29.0 |
| $T_3/°C$ | 30.0 | 25.0 | 25 | 30.0 | 25.0 |
| $T_1/°C$ | −1.0 | −3.5 | 1.0 | 0.0 | 0.0 |
| $\Delta T(BP)/°$ | 40.0 | 37.5 | 30.0 | 30.0 | 29.0 |
| $\Delta T(FR)/°$ | 9.0 | 9.0 | 6.0 | 0.0 | 4.0 |
| Characteristic Voltages | | | | | |
| $T_{op}/°C$ | 10.0 | 10.0 | 10.0 | 5.0 | 5.0 |
| $V_{100, min}/V$ | 41.0 | 52.0 | 74.0 | 57.0 | 40.0 |

Example 5

Again similar to example 3, totally 11.65% of the reactive mesogens and 0.6% of the phitoinitiator Irgacure-651 are added together with 2.7% of the chiral dopant R-5011 to host mixture A-0. Now, however, additionally 3.0% of the trialkoxy-compound (short TRI) of the formula

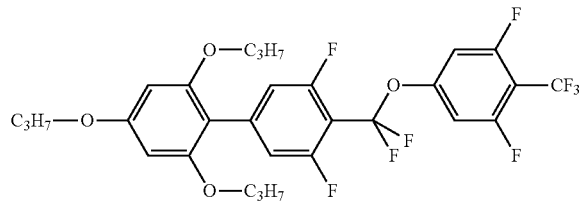

are added to the host mixture A-0, as summarised in the preceeding table, table 10. The resulting mixture is filled into a test cell and cured by illumination with UV and investigated. The characteristic temperatures and the minimum values of the characteristic voltages are determined. The results are also summarised in the preceeding table, table 10.

Examples 6.1 to 6.4

In these examples, besides 12% of the reactive mesogens, 0.6% of the phitoinitiator Irgacure-651 and 2.8% of the chiral dopant R-5011 to host mixture A-0, used in example 3, various amounts of compounds of the type AUUQU-n-F are added, as summarised in the following table, table 10. The resulting mixtures are filled into test cells and cured by illumination with UV and investigated. The characteristic temperatures and the minimum values of the characteristic voltages are determined. The results are also summarised in the following table, table 11. The data for example 3.2 are included in this table for comparison.

TABLE 10

Composition and results of examples 6.1 to 6.4

| Example No. | 3.2 | 6.1 | 6.2 | 6.3 | 6.4 |
|---|---|---|---|---|---|
| Composition | | | | | |
| c(IRG-651)/% | | | 0.6 | | |
| c(R-5011)/% | | | 2.8 | | |
| c(IA-1)/% | | | 7.0 | | |
| c(IB-6)/% | | | 5.0 | | |
| c(IA-1) + c(IB-6)/% | | | 12.0 | | |
| c(AUUQU-1-F)/% | | none | none | none | 8.0 | 9.0 |
| c(AUUQU-2-F)/% | | | | 10.0 | |
| c(AUUQU-3-F)/% | | 15.0 | 10.0 | | 11.0 |
| c(AUUQU-4-F)/% | | none | 10.0 | 7.0 | 9.0 |
| c(AUUQU-5-F)/% | | | none | 5.0 | 7.0 |
| c(AUUQU-6-F)/% | | | | none | 7.0 |
| c(AUUQU-7-F)/% | | | | | 7.0 |
| Σc(AUUQU-n-F)/% | 0.0 | 15.0 | 30.0 | 40.0 | 60.0 |
| Characteristic Temperatures | | | | | |
| $T_2$/° C. | 39.0 | 45.0 | 45.0 | n.d. | n.d. |
| $T_3$/° C. | 30.0 | 25.0 | 25.0 | n.d. | n.d. |
| $T_1$/° C. | −1.0 | 0.0 | <15.0 | n.d. | n.d. |
| ΔT(BP)/° | 40.0 | 45.0 | >30.0 | n.d. | n.d. |
| ΔT(FR)/° | 9.0 | 20.0 | 20.0 | n.d. | n.d. |
| Characteristic Voltages | | | | | |
| $T_{op.}$/° C. | 10.0 | 6.0 | 15.0 | n.d. | n.d. |
| $V_{100, min}$/V | 41.0 | 36.0 | 35.0 | n.d. | n.d. |

Remarks: n.d.: not determined.

Examples 7 and 8

In these examples, like in examples 6.1 to 6.4, additional mesogenic compounds are added to the host mixture A-0, besides the polymer precursor, the chiral dopant and the photo-initiator. Now, however, the compounds added are terminally CN-substituted. The compound used in example 7 is AUZU-3-N and the compound used in example 8 is AUUQU-3-N. The concentration used is 15% in each case, as shown in the following table, table 12. The results are also shown in the following table, table 11.

TABLE 11

Composition and results of examples 7 and 8

| Example No. | 3.2 | 6.1 | 7 | 8 |
|---|---|---|---|---|
| Composition | | | | |
| c(IRG-651)/% | | | 0.6 | |
| c(R-5011)/% | | | 2.8 | |
| c(IA-1)/% | | | 7.0 | |
| c(IB-6)/% | | | 5.0 | |
| c(IA-1) + c(IB-6)/% | | | 12.0 | |
| Compound | none | AUUQU-3-F | AUZU-3-N | AUUQU-3-N |
| c(Compound)/% | 0.0 | | 15.0 | |

TABLE 11-continued

Composition and results of examples 7 and 8

| Example No. | 3.2 | 6.1 | 7 | 8 |
|---|---|---|---|---|
| Characteristic Temperatures | | | | |
| $T_2$/° C. | 39.0 | 45.0 | 45.0 | 55.0 |
| $T_3$/° C. | 30.0 | 25.0 | 35.0 | 35.0 |
| $T_1$/° C. | −1.0 | 0.0 | 0.0 | 5.0 |
| ΔT(BP)/° | 40.0 | 45.0 | 45.0 | 50.0 |
| ΔT(FR)/° | 9.0 | 20.0 | 20.0 | 20.0 |
| Characteristic Voltages | | | | |
| $T_{op.}$/° C. | 10.0 | 6.0 | 10.0 | 10.0 |
| $V_{100, min}$/V | 41.0 | 36.0 | 39.0 | 32.0 |

Remarks: n.d.: not determined.

The temperature dependence of the characteristic voltages of the cell of example 8 is given in table 12 below.

TABLE 12

Temperature dependence of characteristic voltages of example 8

| T/° C. | $V_{10}$/V | $V_{90}$/V |
|---|---|---|
| −10.0 | 56 | 126.0 |
| −5.0 | 28 | 60.0 |
| 0.0 | 18 | 38.0 |
| 10.0 | 14.0 | 28.0 |
| 20.1 | 15.0 | 29.0 |
| 29.9 | 16.0 | 31.0 |
| 30.2 | 16.0 | 31.0 |
| 35.2 | 17.0 | 32.0 |
| 40.0 | 18.0 | 33.0 |
| 45.0 | 18.0 | 35.0 |
| 50.0 | 20.0 | 38.0 |
| 55.0 | 21.0 | 44.0 |
| 60.0 | 37.0 | 70.0 |

The temperature range over which the response times $\tau_{on}$ and $\tau_{off}$ both are below 5 ms and at the same time the characteristic voltage are still sufficiently low for this example (3.2) extends from 35.2° C. to 55.0° C.

Examples 9.1 to 9.3 and Comparative Examples 9.1 and 9.2

In comparative example 9.1 the total amount of 7% by weight of the mono-reactive mesogenic compound IA-1 used in example 3.2 is replaced by an equal percentage (7% by weight) of the non-mesogenic mono-reactive compound EHA used in comparative example 2. Otherwise the composition is kept unchanged. The resulting system does not show a stabilised BP-texture under the microscope.

In comparative example 9.24% by weight of the non-mesogenic mono-reactive compound EHA used in comparative example 2 is used together with 8% of the di-reactive mesogenic compound IB-6. The results obtained are shown in the following table, table 13.

In examples 9.1 to 9.3 the mono-reactive mesogenic compound IA-1 is used simultaneously with the non-mesogenic mono-reactive compound EHA. The concentration of the polymer precursors is kept constant at 12%, whereas the relative concentrations of the mono-reactive compounds are changed systematically, as shown in the following table, table 13.

TABLE 13

Composition and results of examples 9.1 to 9.4 and comparative example 9.2

| Example No. | 3.2 | 9.1 | 9.2 | 9.3 | 9.4 | C.E. 9.2 |
|---|---|---|---|---|---|---|
| Composition | | | | | | |
| c(IRG-651)/% | 0.6 | 0.61 | | | 0.62 | 0.64 |
| c(R-5011)/% | 2.8 | 2.84 | 2.86 | 2.90 | 2.92 | 3.0 |
| c(IA-1)/% | 7.0 | 5.6 | 4.9 | 3.5 | 2.8 | 0.0 |
| c(EHA)% | 0.0 | 0.8 | 1.2 | 2.0 | 2.4 | 4.0 |
| c(IB-6)/% | 5.0 | 5.6 | 5.0 | 6.5 | 6.8 | 8.0 |
| [c(IA-1) + c(EHA) + c(IB-6)]/% | | | 12.0 | | | |
| Characteristic Temperatures | | | | | | |
| $T_2$/° C. | 39.0 | n.d. | n.d. | n.d. | 36.0 | 55.0 |
| $T_3$/° C. | 30.0 | n.d. | n.d. | n.d. | 24.0 | 35.0 |
| $T_1$/° C. | −1.0 | n.d. | n.d. | n.d. | −5.0 | 0.0 |
| ΔT(BP)/° | 40.0 | n.d. | n.d. | n.d. | 41.0 | 55.0 |
| ΔT(FR)/° | 9.0 | n.d. | n.d. | n.d. | 12.0 | 30.0 |
| Characteristic Voltages | | | | | | |
| $T_{op}$/° C. | 10.0 | n.d. | n.d. | n.d. | 0.0 | 5.0 |
| $V_{100, min}$/V | 41.0 | n.d. | n.d. | n.d. | 44.0 | 54.0 |

Remarks: n.d.: not determined.

For the systems of examples 3.2 and 9.1 to 9.3, as well as for comparative examples 09.1 and 9.2 the characterisic temperature(s) is/are monitored during the polymerisation process at appropriate regular time intervals until no further change is observed.

The results are compiled in the following table, table 14.

татBLE 14

Composition and charactristic temperatures during polymerisation of examples 9.1 to 9.3 and comparative example 9.2

| Example No. | 3-2 | 9-1 | 9-2 | 9-3 | 9.4 | C.E. 9-2 | C.E. 9-1 |
|---|---|---|---|---|---|---|---|
| c(IRG-651)/% | 0.6 | 0.61 | | | 0.62 | 0.64 | 0.6 |
| c(R-5011)/% | 2.8 | 2.84 | 2.90 | 2.90 | 2.92 | 3.0 | 2.8 |
| c(IA-1)/% | 7.0 | 5.6 | 3.5 | 3.5 | 2.8 | 0.0 | |
| c(EHA)% | 0.0 | 0.8 | 2.0 | 2.0 | 2.4 | 4.0 | 7.0 |
| c(IB-6)/% | 5.0 | 5.6 | 6.5 | 6.5 | 6.8 | 8.0 | 5.0 |
| [c(IA-1) + c(EHA) + c(IB-6)]/% | | | | 12.0 | | | |
| Characteristic Temperatures During Curing | | | | | | | |
| Time(curing)/S | | | | $T_2$/° C. | | | |
| 0 | 48.3 | 43.5 | 39.9 | 35.8 | 31.0 | 17.0 | 0.0 |
| 5 | n.d. | n.d. | n.d. | n.d. | 31.0 | 17.0 | 0.0 |
| 10 | n.d. | 42.8 | 39.9 | 35.8 | 31.0 | 18.0 | −3.0 |
| 15 | 46.2 | n.d. | n.d. | n.d. | 31.0 | 19.0 | −3.0 |
| 20 | n.d. | 41.0 | 38.6 | 34.9 | 31.0 | 20.0 | n.d. |
| 25 | n.d. | n.d. | n.d. | 34.9 | 31.0 | 21.0 | n.d. |
| 30 | 43.6 | 39.2 | 37.4 | n.d. | 31.0 | 22.0 | 10.0 |
| 40 | n.d. | 39.2 | n.d. | 34.3 | 31.0 | 23.0 | n.d. |
| 45 | 42.0 | n.d. | n.d. | n.d. | 31.0 | n.d. | n.d. |
| 50 | n.d. | n.d. | n.d. | n.d. | n.d. | 24.0 | n.d. |
| 60 | 41.2 | 39.2 | n.d. | 34.3 | n.d. | 25.0 | 20.0 |
| 75 | n.d. | n.d. | n.d. | n.d. | 31.0 | 26.0 | n.d. |
| 90 | 40.0 | 39.2 | 37.4 | n.d. | n.d. | 27.0 | 24.2 |
| 105 | n.d. | n.d. | n.d. | n.d. | n.d. | 28.0 | n.d. |
| 120 | 40.0 | 39.2 | n.d. | n.d. | 31.0 | 29.0 | 27.8 |
| 135 | n.d. | n.d. | 37.4 | 34.3 | n.d. | n.d. | n.d. |
| 140 | n.d. | n.d. | n.d. | n.d. | n.d. | 29.5 | n.d. |
| 150 | n.d. | 39.2 | n.d. | n.d. | n.d. | n.d. | 30.2 |
| 160 | n.d. | n.d. | n.d. | n.d. | n.d. | 30.0 | n.d. |
| 180 | 40.0 | 39.2 | 37.4 | 34.3 | 31.0 | 31.0 | 32.2 |
| 210 | n.d. | 39.2 | n.d. | n.d. | n.d. | 31.5 | n.d. |
| 240 | n.d. | 39.2 | n.d. | n.d. | n.d. | 32.0 | 34.9 |
| 300 | n.d. | n.d. | n.d. | n.d. | n.d. | 32.0 | 36.5 |

TABLE 14-continued

Composition and charactristic temperatures during polymerisation of examples 9.1 to 9.3 and comparative example 9.2

| Example No. | 3-2 | 9-1 | 9-2 | 9-3 | 9.4 | C.E. 9-2 | C.E. 9-1 |
|---|---|---|---|---|---|---|---|
| 360 | n.d. | n.d. | n.d. | n.d. | n.d. | 32.0 | 37.7 |
| 420 | n.d. | n.d. | n.d. | n.d. | n.d. | n.d. | 38.6 |
| 540 | n.d. | n.d. | n.d. | n.d. | n.d. | n.d. | 40.0 |

Remarks: n.d.: not determined.

As can be seen from the results in table 14 appropriate selection both of mono-reactive compounds being mesogenic and of mono-reactive compounds being non-mesogenic, as well as selecting their appropriate mixing ratio in the polymer precursor allows to minimise the change of the transition temperature during the process of polymerisation, in order to keep the system in the preferred phase, preferably the Blue Phase, and thus makes a control and adjustment of the temperature during the process of polymerisation obsolete.

Especially the results for example 9.2, which are almost completely compensated for temperature change during the process, and for example 9.3 clearly illustrate this effect.

In particular, example 9.4 shows almost no temperature change of $T_2$ after polymerisation. Thus, example 9.4a, with stepwise polymerisatoin, as described above, is repeated, but with 180 mS exposure to UV in one single application as additional example 9.4b. The result of the previous example (9.4a) is well reproduced also this way.

In contrast example 3.2 shows a marked decrease of the transition temperature during polymerisartion, whereas comparative examples 9.1 and 9.2 both show the opposite change of the transition temperature upon polymerisation, both of which are undesired.

The invention claimed is:

1. A mesogenic system comprising
a) a polymeric component, component A, obtained from polymerization of a precursor comprising
one or more mesogenic mono-reactive compounds of formula IA

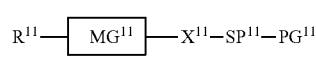

wherein
$R^{11}$ is H, F, Cl, Br, I, CN, $NO_2$, NCS, $SF_5$, $SO_2CF_3$ or alkyl which is straight chain or branched, is unsubstituted, mono- or poly-substituted by F, Cl, Br, I or CN, and in which one or more non-adjacent $CH_2$ groups are optionally replaced, in each case independently from one another, by —O—, —S—, —NH—, —$NR^{O1}$—, —$SiR^{O1}R^{O2}$—, —CO—, —COO—, —OCO—, —OCO—O—, —S—CO—, —CO—S—, —$CY^1$=$CY^2$— or —C≡C— in such a manner that O and/or S atoms are not linked directly to one another, $R^{O1}$ and $R^{O2}$ are, independently of each other, H or alkyl with 1 to 12 C— atoms,

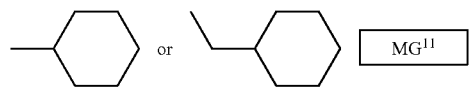

is a mesogenic moiety,

PG$^{11}$ is a polymerizable or reactive group,

Sp$^{11}$ is a spacer group or a single bond, and

X$^{11}$ is —O—, —S—, —CO—, —CO—O—, —O—CO—, —S—CO—, —CO—S—, —O—CO—O—, —CO—NR$^{01}$—, —NR$^{01}$—CO—, —OCH$_2$—, —CH$_2$O—, —SCH$_2$—, —CH$_2$S—, —CF$_2$O—, —OCF$_2$—, —CF$_2$S—, —SCF—, —CH$_2$CH$_2$—, —CF$_2$CH$_2$—, —CH$_2$CF$_2$—, —CF$_2$CF$_2$—, —CH=N—, —N=CH—, —N=N—, —CH=CR$^{01}$—, —CY$^{01}$=CY$^{02}$—, —C≡C—, —(CH$_2$)$_4$—, —CH=CH—CO—O—, —O—CO—CH=CH— or a single bond, and Y$^{01}$ and Y$^{02}$ are, independently of each other, F, Cl or CN, and alternatively one of them may be H, one or more di-reactive compounds, which optionally are also mesogenic compounds and optionally a photo-initiator and b) a low molecular weight component, component B, comprising one or more mesogenic compounds and one or more chiral dopants, exhibiting a Blue Phase.

2. The system according to claim 1, wherein the precursor of component A comprises one or more mesogenic di-reactive compounds.

3. The system according to claim 1, wherein the precursor of component A comprises one or more non-mesogenic (isotropic) mono-reactive compounds.

4. The system according to claim 1, wherein the precursor of component A comprises one or more compounds, which lead to an increase of the characteristic temperatures during and/or upon its polymerization and one or more compounds which on their own lead or would lead to a decrease of the characteristic temperatures during and/or upon its polymerization.

5. The system according to claim 1, having a Blue Phase extending at least over a temperature range from −10° C. or below to +50° C. or above.

6. A light modulation element, comprising a system according to claim 1.

7. In a light modulation medium comprising a mesogenic system, the improvement wherein the system is one according to claim 1.

8. An electro-optical display, comprising a system according to claim 1.

9. They system according to claim 2, wherein the mesogenic di-reactive compound is $$PG^{12}-SP^{12}-X^{12}-\boxed{MG^{12}}-X^{13}-SP^{13}-PG^{13} \quad \text{IB}$$

wherein $$\boxed{MG^{12}}$$

has the meaning given for $$\boxed{MG^{11}}$$

under formula I above,

PG$^{12}$ and PG$^{13}$ independently of each other, have one of the meanings given for PG$^{11}$ in formula I, SP$^{12}$ and SP$^{13}$ independently of each other, have one of the meanings given for SP$^{11}$ in formula I, and X$^{12}$ and X$^{13}$ independently of each other, have one of the meanings given for X$^{11}$ in formula I.

* * * * *

UNITED STATES PATENT AND TRADEMARK OFFICE
CERTIFICATE OF CORRECTION

PATENT NO. : 9,567,522 B2
APPLICATION NO. : 13/801403
DATED : February 14, 2017
INVENTOR(S) : Cecile Schott et al.

Page 1 of 1

It is certified that error appears in the above-identified patent and that said Letters Patent is hereby corrected as shown below:

On the Title Page

Related U.S. Application Data reads:
(62) Division of application No. 13/243,472, filed on Sep. 23, 2011, now Pat. No. 8,409,469, which is a division of application No. 12/823,186, filed on Jun. 25, 2010, now Pat. No. 8,333,906, which is a division of application No. 11/721,849, filed on Jun. 15, 2007, now Pat. No. 7,794,621.

Should read as follows:
(62) Division of application No. 13/243,472, filed on Sep. 23, 2011, now Pat. No. 8,409,469, which is a division of application No. 12/823,186, filed on Jun. 25, 2010, now Pat. No. 8,333,906, which is a division of application No. 11/721,849, filed on Jun. 15, 2007, now Pat. No. 7,794,621, which is a National Phase of PCT/EP2005/012478, filed Nov. 22, 2005, published as WO 2006/063662 on Jun. 22, 2006.

Signed and Sealed this
Eleventh Day of June, 2019

Andrei Iancu
*Director of the United States Patent and Trademark Office*